US005936614A

United States Patent [19]
An et al.

[11] Patent Number: 5,936,614
[45] Date of Patent: Aug. 10, 1999

[54] USER DEFINED KEYBOARD ENTRY SYSTEM

[75] Inventors: Yu Larry An, Vienna, Va.; Gordon W. Arbeitman, Gaithersburg, Md.; Peter A. Lee, Houston, Tex.; Alan R. Tannenbaum, Washington Grove, Md.

[73] Assignee: International Business Machines Corporation, Armonk, N.Y.

[21] Appl. No.: 08/612,480

[22] Filed: Mar. 7, 1996

Related U.S. Application Data

[63] Continuation of application No. 07/693,868, Apr. 30, 1991, abandoned.

[51] Int. Cl.[6] .................................................. G09G 5/00
[52] U.S. Cl. ........................................ 345/173; 345/342
[58] Field of Search ...................................... 340/706, 709, 340/710, 711, 712; 341/23, 21; 178/18, 19; 345/156, 168, 173, 119, 120, 113, 340, 342, 343, 348, 352

[56] References Cited

U.S. PATENT DOCUMENTS

| Re. 32,253 | 9/1986 | Bartulis et al. | 340/712 |
|---|---|---|---|
| 4,587,630 | 5/1986 | Straton et al. | 364/900 |
| 4,680,729 | 7/1987 | Steinhart | 340/712 |
| 4,725,694 | 2/1988 | Auer et al. | 340/712 |
| 4,803,463 | 2/1989 | Sado | 340/712 |
| 4,811,240 | 3/1989 | Ballou et al. . | |
| 5,010,323 | 4/1991 | Hoffman | 340/712 |
| 5,148,155 | 9/1992 | Martin et al. | 345/173 |

FOREIGN PATENT DOCUMENTS 0144817  7/1985  Japan ........................................ 341/23

OTHER PUBLICATIONS

Weiskamp et al, Power Graphics Using Turbo Pascal, 1989, pp. 221–226.
Wolfe, Keyboard for Electronic Tablet or digitizer, IBM Technical Disclosure Bulletine, vol. 14, No. 3, Aug. 1971.

*Primary Examiner*—Chanh Nguyen
*Attorney, Agent, or Firm*—Morgan & Finnegan, LLP; Joseph C. Redmond, Jr.; Martin J. McKinley

[57] ABSTRACT

A computer system enables a user to design touch activated keyboards for use on a display surface without writing code. The computer system enables the user to resize and move the keyboard image anywhere on the display to allow the concurrent display of other applications running in an integrated operating environment. Computer system actions can be assigned by the user to each key. An execution unit displays the selected keyboard, determines whether a key has been touched and executes the appropriate action for each key touch.

38 Claims, 11 Drawing Sheets

USER DEFINED KEYBOARD ENTRY SYSTEM

This application is a Continuation of U.S. patent application Ser. No. 07/693,868, filed Apr. 30, 1991, now abandoned.

BACKGROUND OF THE INVENTION

The present invention relates to a transparent touch panel disposed over the display of a computer system. More particularly, it relates to an apparatus and method for constructing user generated touch activated keyboards for input of data at the main display of a computer system, most particularly, in an integrated operating environment.

The use of a touch input device at the display surface of a computer terminal is well known in the art. Human factor studies have shown that devices which allow the user to input data directly on the display of a computer, generally known in the art as touch display devices, achieve the greatest immediacy and accuracy between man and machine. Typically, an image of a menu is presented to the user by the display listing a set of available actions which may be taken by the data processing system will inform the data processing system. The user's touch on a sensor disposed over the display at or near designated areas will inform the data processing system which action to execute. Menu entries might include a command for execution, a graphical element for enlargement, movement or duplication or a data file for processing. Many of these touch driven menus have been used in special purpose computers such as, point-of-sale terminals, information kiosks, or to control equipment such as copiers.

Also known in the art are peripheral input devices called soft keyboards. In these devices, a touch input sensor with a number of physically defined keypads is disposed over a flat panel display. The display indicates the result of touching a given keypad to the user. For example, the letter "A" is displayed under the touch key which when touched will cause the touch device to input the electrical signals which the computer system will recognize as corresponding to the ascii character "a". These devices provide for modification by the user, each position may be associated with one of the ascii characters, or with some devices, might be associated with an entire string of command characters according to the user's preference. As the array of switches are fixed in position in the touch sensor, key placement on the associated display is somewhat limited. The soft keyboards are not used as the primary display of computer system, but are used as a substitute input device for the hard keyboard attached to the computer system. Thus, the soft keyboards do not provide the immediacy of the touch input devices disposed on the same main display which shows the users the results of their input.

One trend to improve the accessibility of sophisticated applications is through the use of integrated operating environments presenting a uniform graphical user interface. Examples of integrated operating environments include, Microsoft Windows (™) or IBM Presentation Manager (™). Through these environments, the uniform presentation of applications developed by disparate developers provides an aid to understanding how to manipulate applications which run in the environment. Further, they allow the computer system to run and display information from several individual application programs on the same display with each application program in its own window.

Most of the present applications and integrated operating environments accept input only from mouse or keyboard input devices, although it is envisioned that future applications and environments will accept input from touch input devices. However, the known touch means and methods provide only a partial solution to the marriage of touch input and an integrated operating environment. In the prior art, the touch activated menus are designed for a specific application, do not send input to other applications operating on a general purpose computer and are not modifiable by the user. Similar hard coded menus can be provided with the applications, the operating system and/or the integrated operating environment. The user of hard coded touch activated keyboard images such as a QUERTY keyboard for use with a word processing program or a numeric keypad have been suggested. However, it is unlikely that a finite set of menus and/or keyboards provided by the software designer will meet the requirements of all, or even most users of the computer system. New applications will also put additional demands on the soft keyboards provided with the integrated operating environment.

Limited user defined touch activated key areas have been proposed which recognize the desirability of allowing users to define the result of touching a given area of a touch sensor disposed over the main display. Usually, a region at the edge of the display is set aside for a key or set of keys with functions to be assigned by the user. This offers some flexibility to the user in adding new function to the system. As the key images are on the main display, the key areas provide more immediacy than a peripheral soft keyboard device. Further, at least one proposal would allow the user to create and delete key images anywhere on the screen. Yet these methods are not fully compatible with the highly mutable multi-window environment present in today's integrated environments. In the above techniques, the key images are fixed on the display, which limits the movement of application containing windows across the screen without covering the keys. With a large number of touch selections and application windows, this becomes nearly impossible. The ability of the user to create and delete touch keys anywhere on screen would seem to be an improvement. In practice, however, a user does not wish to create a keyboard image each time he moves or sizes a window. Further, it is difficult to create a keyboard image with a pleasing appearance, i.e. keys correctly placed and aligned in rows and columns, same key spacing, same size keys, etc. It is unlikely that a keyboard image can be effectively and pleasingly designed by hand in a reasonable period of time, particularly if it must be done each time an application window is relocated on the display.

It would be desirable to provide a means and method of enabling a computer user to develop his own customized touch activated keyboard compatible with the highly mutable display of an integrated operating environment. Assuming relatively low skills for a user, added to the lack of access to the source code of a commercially developed application program, no code writing should be necessary. The user designed keyboard should be compatible with all applications running in the environment.

SUMMARY OF THE INVENTION

It is therefore an object of the present invention to allow the user of a computer system to design touch activated keyboards for use on a display surface without writing code.

It is another object of the invention to enable communication from a user designed, touch activated keyboard with any application running in the integrated operating environment.

It is another object of the invention to provide means for a user to copy, move, size and otherwise generate keys within a user designed touch activated keyboard.

It is another object of the present invention to resize and move the keyboard image anywhere on the display to allow the concurrent display of other applications running in the integrated operating environment.

These objects and others are accomplished by a keyboard editor preferably running as a separate application in the integrated operating environment.

Running in its own window, the keyboard editor creates a keyboard display space in which the user constructs a keyboard image. A plurality of means of defining keys within the keyboard image is provided by the editor. For example, he can draw keys free-hand, use standard geometric shapes, e.g. squares, circles, etc. or copy keys of previously generated keyboards in the new keyboard. The editor also includes means to move, align, space and size the keys within the editing space. As the keys are defined, moved and sized within the keyboard display space, their location and size are kept in a keyboard file which relates these dimensions to a keyboard origin point and the overall dimensions of the keyboard display space. This keyboard file is used when the final touch activated keyboard is executed in the computer system. Further, the keyboard editor includes means for designing the key legends displayed on each key. The key legends can be either alphanumeric characters or graphical symbols. The keyboard legends are placed in a table used to display the final keyboard image.

After the keyboard image is constructed, the editor interrogates the user to determine what computer system actions result from touching each key. The result can be simple, such as the generation of a single alphanumeric character. The result can be more complex, such as the generation of a string of characters or the execution of a "system macro" which includes keystrokes, menu selections and program invocations. Where a key is copied from another keyboard, the result of pressing the key can be transferred to the newly created keyboard. For certain key legends, the editor can provide default settings for the parameters where the user decides not to specify. The actions associated with each key are also placed in a keyboard table used during the execution of the keyboard.

The keyboard editor also includes a library unit for the storage of keyboards created by the user or previous designs by software designers. The library will contain files containing information on the appearance of the keyboard image, the location of the keys within the image and the result of pressing each key. Once computer system actions are assigned to each key and stored, a execution unit of the editor is responsible for the actual operation of the keyboard in the computer system. The execution unit for display the selected keyboard, determine whether a key has been touched and execute the appropriate actions for each key touch.

Using the editor, the user can develop a keyboard which fits his particular needs for a particular program. Single key stroke access for a complex procedures can be provided. For example, two different programs may require very different sequences of arcane key combinations to accomplish the same task, e.g., saving a file. With the keyboard editor the user can design two keyboards, each with the key labeled "save file", but with different outputs consistent with the requirements of two application programs. These and other objects and features of the present invention will be appreciated more fully with reference to the accompanying drawings.

DETAILED DESCRIPTION OF THE DRAWINGS

Figure 1:
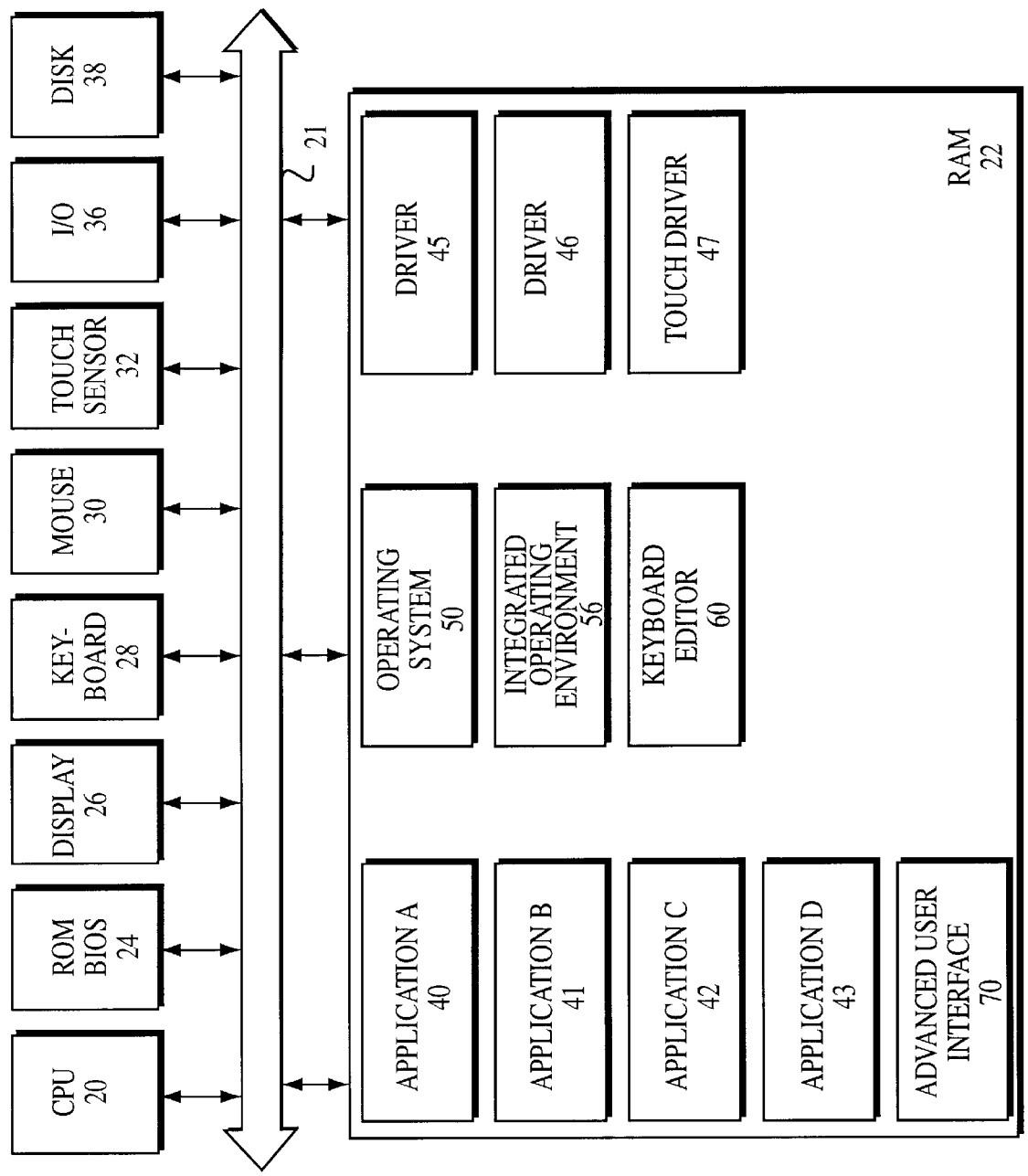
FIG. 1 is an architectural diagram of a computer system having a touch input device for use with the present invention.

Referring to FIG. 1, a computer system for use with a touch input device is depicted. The invention is primarily envisioned for use with a personal computer such as the IBM PS/2 (™), however, the invention may be extended to other individual workstations or to much larger data processing systems. The preferred touch input device is described in U.S. Pat. No. 4,686,332 to Greanias et al., and copending application Ser. No. 351,227 to Arbeitman et al., entitled "Flat Touch Screen Workpad For A Data Processing System" filed May 15, 1989, and hereby incorporated by reference. Certain improvements are described in copending application serial number 524,778 to Akins et al., entitled "Improved Stylus Sensing System" filed Oct. 15, 1990 and also hereby incorporated by reference. These references described a laminate touch overlay having vertical and horizontal parallel arrays of ITO conductors deposited on transparent substrate layers within the overlay. The location of a stylus is determined by a signal amplitude measured by the stylus as the various horizontal and vertical conductors are energized by a 40 KHz oscillator signal. The location of a finger touch is determined by the change of capacitance induced in the ITO conductors. However, the present invention may be used in association with any touch input device disposed at the surface of the main display of the computer system including lasers or LED arrays, transparent membrane overlays and strain gauge detectors, as long as the touch input derive has a sufficiently fine resolution to allow the placement of a keyboard image anywhere on the display.

The computer system depicted in FIG. 1 includes a central processing unit (CPU) 20 connected by means of a system bus 21 to a random access memory (RAM) 22 and a read only memory (ROM) 24. Also included in the computer system are display 26 by which the computer system presents information to the user and a plurality of input devices including keyboard 28, mouse 30 and touch sensor 32. The display and input devices are connected to the CPU 20, RAM 22, ROM 24 by means of the system bus 21. The computer system further comprises I/O 36 which can be connected to communication lines or I/O equipment and disk storage 38 which can provide permanent storage for the applications running in RAM 22.

When the computer system is operating in accordance with the principles of the present invention, a plurality of applications 40, 41, 42, 43, are resident in RAM 22, together with the operating system 50 and the integrated operating environment 56. Also in the random access memory 22 are the drivers 45, 46 and 47 which interpret the electrical signals from the keyboard 28, mouse 30 and touch input device 32. Although depicted in FIG. 1 as entirely software, the drivers 45, 46 and 47 can also be a combination of hardware and software. Also, resident in RAM 22 is the keyboard editor 60.

In its most preferred embodiment, the keyboard editor 60 is an application operating cooperatively with an advanced user interface 70 as described in copending application Ser. No. 344,879 to Greanias et al., entitled "Advanced User Interface", filed Apr. 28, 1989 and hereby incorporated by reference. The advanced user interface 70 described in that referenced application enables input signals generated by input devices such as a touch sensor 32 to be translated into input messages usable by applications 40, 41, 42, 43, which do not understand touch sensor input. The touch messages would normally be translated into keyboard or mouse messages which these applications understand and can utilize. Other translation means would need to be provided if the advanced user interface 70 were not used and the applications did not understand touch input. Other input devices, such as voice or image sensors can be used with the advanced user interface 70, however, as they are not pertinent to the present invention, these devices are not described. In addition, the advanced user interface 70 can translate handwritten characters and/or gestures to mouse or keyboard messages. Similarly, these functions are not directly pertinent to the present invention and thus are not described in any detail.

Figure 2:
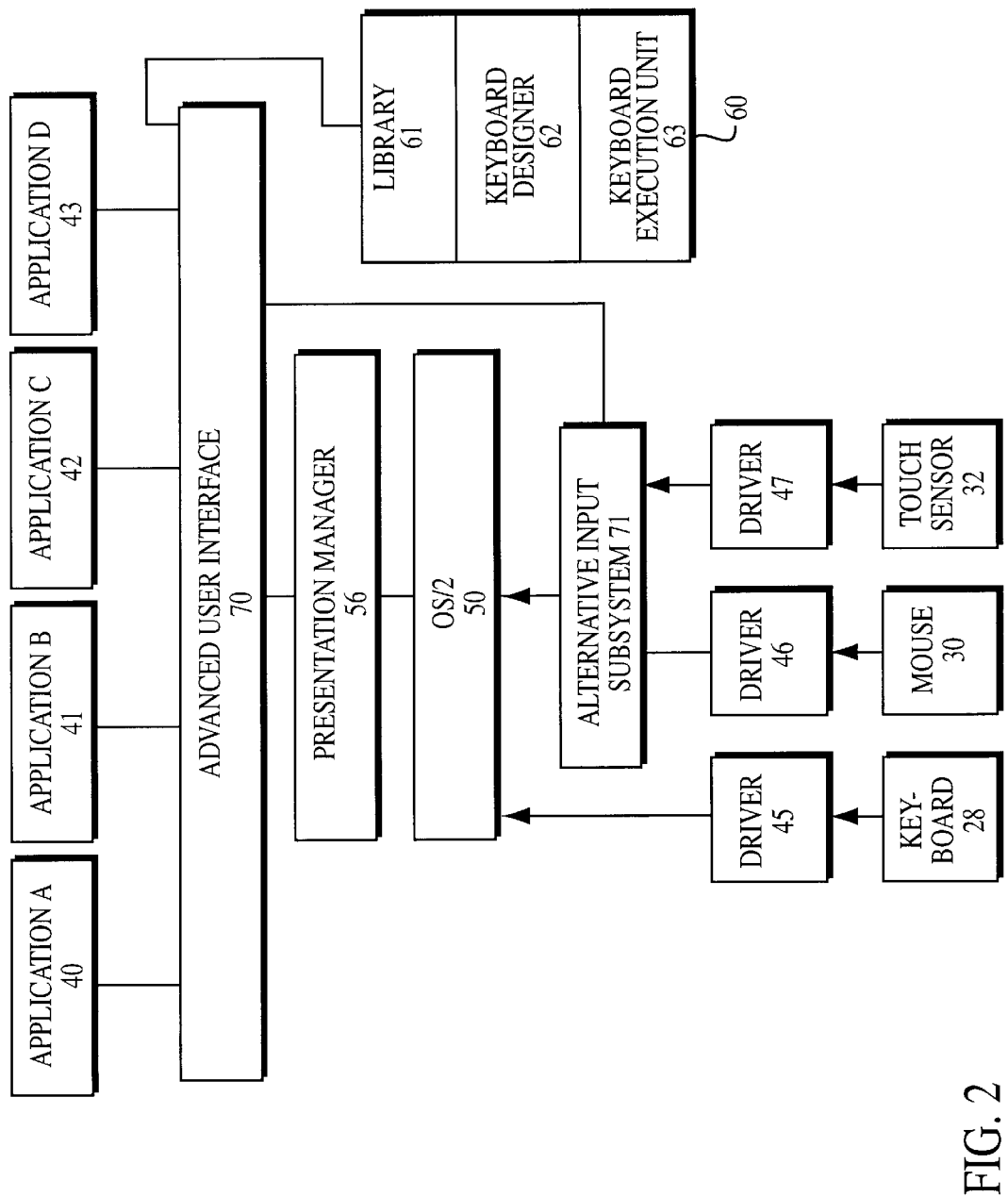
FIG. 2 is a block diagram showing the interaction of computer system software and hardware in response to actions of user.

FIG. 2 depicts a computer system designed in accordance with the present invention where OS/2 (™) is the operating system 50 and Presentation Manager is the integrated operating environment 56. Because of the peculiarities of OS/2 50 and Presentation Manager (PM) 56, an alternate input subsystem (AIS) 71 of the advanced user interface 70 is necessary. OS/2 50 has a single queue which time stamps all input and requires that all input be queued to be transmitted to an application. However, since the single queue allows only keyboard and mouse input, input from alternate input devices such as the touch sensor 32 cannot be handled by OS/2 50. Thus, the alternate input subsystem 71 is connected to the touch sensor device driver 47 to convert any of the touch sensor messages to mouse messages. If OS/2 50 and PM 56 accepted touch messages, the AIS 71 would be unnecessary. The mouse driver 46 could be connected directly to the OS/2 50 as is the keyboard driver 45, rather than the AIS 71 as shown in FIG. 2. OS/2 50 passes the message to Presentation Manager 56 which keeps track which application is active at the time that the input message from the user was received. The main portion of the advanced user interface 70 intercepts that message to determine whether the message was indeed a mouse message or was a message from the touch sensor 32. Depending on the capabilities of the application for which the touch message was intended, the advanced user interface 70 will either transmit the touch message or will translate that message into a form which is understood by the application, e.g., a mouse message.

The applications 40, 41, 42 and 43 and keyboard editor 60 can be run concurrently on the computer system, each in its respective window. Presentation Manager 56 keeps track of which application presented on display 26 has the input focus at a given time. PM 56 also enables applications to send messages to each other, thereby enabling calculations from a spreadsheet application to be incorporated into the text generated by a word processing application, or other similar tasks. The keyboard editor 60 can use this feature of the integrated operating environment 56 to transmit messages to the other applications related to the depression of a key on a touch activated keyboard displayed in its window. As shown in FIG. 2, the keyboard editor 60 is comprised of three major subunits. A keyboard library 61 stores a set of keyboard files describing predesigned keyboards as well as newly designed keyboards of the system user. While the exact nature of the keyboard information stored is dependent on the particular implementation of the keyboard editor 60, a keyboard file will contain information on the appearance of the keyboard image such as the key legend, the location and size of the keys within the image and the result of touching each key. The keyboard designer 62 allows the user to design the touch activated keyboards without writing code to an application program and includes means to copy, move, size, align, delete and assign meaning to the various keys in the keyboard. The keyboard execution unit 63 is responsible for displaying the keyboard image, determining whether a key has been touched and sending the results of the key touches to the intended application. The keyboard execution unit 63 can also be designed as a stand alone application for users who do not wish to write their own keyboards.

Figure 3:
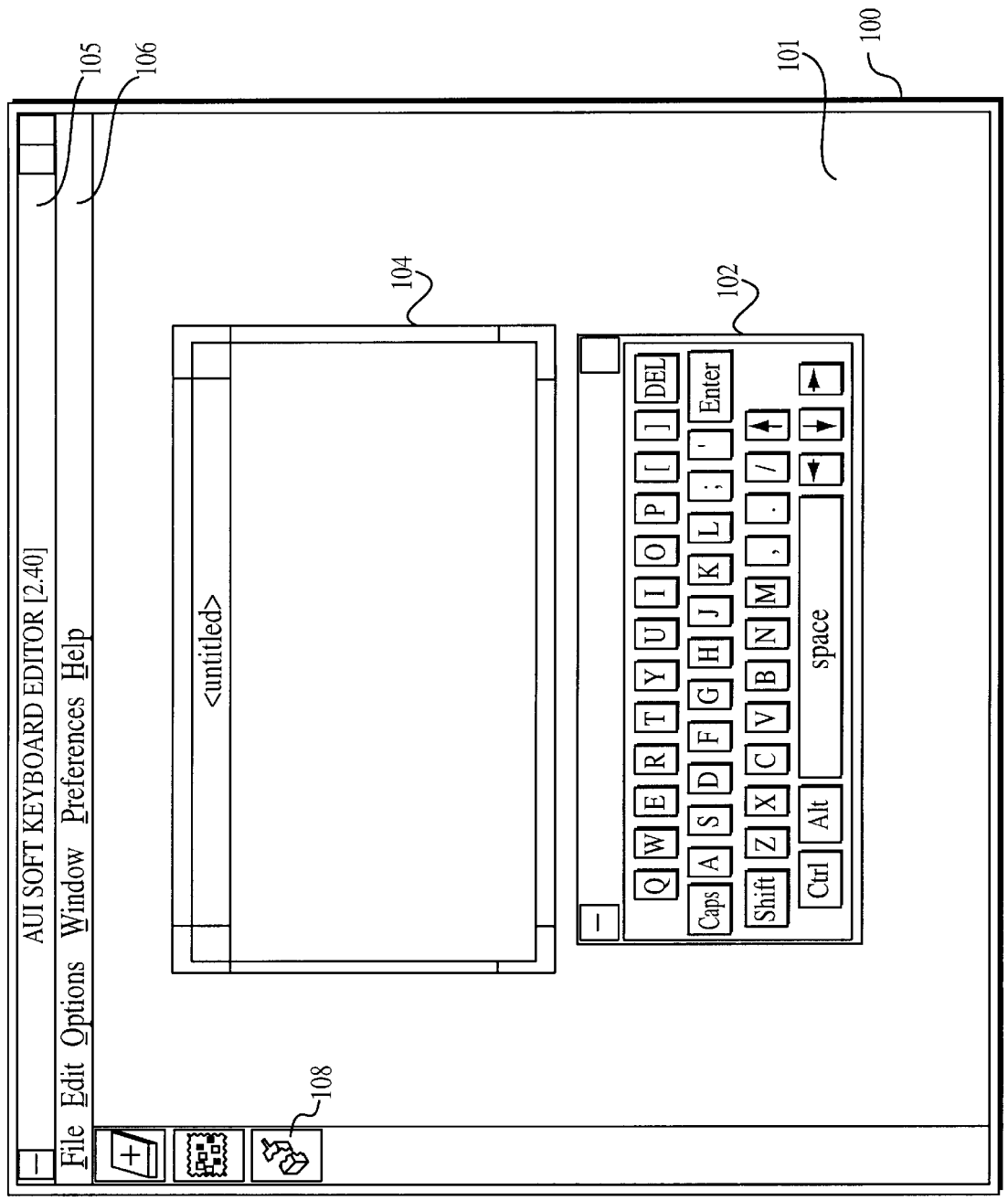
FIG. 3 shows a representation of the keyboard editor running with a previously defined query keyboard and a editor space for a new keyboard.

FIG. 3 depicts a preferred embodiment for the presentation of the keyboard editor 60 as it runs in a integrated operating environment such as Presentation Manager 56. The appearance and operation of the preferred embodiment of the keyboard editor 60 is designed in accordance with the Common User Access (CUA) guidelines for Presentation Manager applications. The guidelines are intended to provide users with a standard means of accessing software operating in PM. For more information on CUA guidelines, see *SAA Common User Access Advanced Interface Design Guide*. As shown, the keyboard editor window 100 has a work area 101 which contains a preset "querty" keyboard 102 and a new keyboard space 104 which will be used for a creation of a new keyboard. The title bar 105 of the window indicates that this is the "Advanced User Interface Soft Keyboard Editor". In addition to a typical action bar 106, there is a tool box area 108 which contains several icons. In an earlier version these icons present different editing modes which the user choose to touch, selecting one of the icons. The keyboard editor window 100 displayed in FIG. 3 can be invoked in many ways. As is typical in Presentation Manager 56, the keyboard editor 60 may be represented by an icon if it has been installed in the program selector. A user will simply bring the pointer to the keyboard editor icon and double click with a mouse, or the equivalent touch input, selecting the editor 60 and opening it in Presentation Manager 56. It is also possible to type a command such as "KBEDITOR" on the command line to callup the KBEDITOR.EXE file on the hard disk. Further, consistent with the method described in copending application Ser. No. 344,879 entitled "Advanced User Interface", a gesture on the touch sensor such as a circle can be used to invoke the keyboard editor 60.

In this previous embodiment, there were six icons: A hand icon which represented the normal mode, moved keys between keyboards or within a keyboard. A plus icon, or new key mode, added new keys to the keyboard. The copy icon, or duplicate mode, made copies of currently selected keys from a previously designed keyboard to a new keyboard. A change icon, or change mode, changed individual keys of the keyboard. A group select icon, or select mode, selected a group of keys for future manipulation. Finally, a delete icon or delete mode, deleted the currently selected keys from the keyboard. As "modes" were not intuitive to many users, the tool box area 108 has been redesigned to contain new icons: a new key icon from which new keys can be dragged to a keyboard. A clipboard icon to which keys from one keyboard can be dragged to a clipboard and keys in the clipboard can be dragged out another keyboard. Also, a delete key icon to which keys can be dragged for deletion. These actions can also be selected from the pull down menus from the action bar 106 as will be described in greater detail.

A keyboard can be invoked in two different modes. The querty keyboard 102 is an example of the view only mode. In view only mode, keys can only be copied to another keyboard and no modifications can be made to the keyboard itself. In this mode, keyboards are in effect "read only" and can be identified by the black border which is a dialog box type border in the CUA guidelines. The new keyboard 104 is an example of editable mode. An editable keyboard is one which can be modified by the user, having keys added, removed and changed within the keyboard workspace. Editable keyboards have a sizing border as defined by CUA. Those skilled in the art would recognize that other keyboard classifications are possible in the middle ground between the view only and editable modes when some functions are operable on some keys but not others. In the preferred embodiment, keyboards are opened from the "file" pull down menu 110 shown in FIG. 4. The first selection, "New" is used to start a new keyboard which is by necessity editable. "Open", the second selection, will open a preexisting keyboard file in editable mode, while "Open for View" will open a preexisting keyboard file in view only mode. After choosing one of these options, a list of existing keyboards from the library 61 is displayed, the user will simply indicate which of the keyboards listed is desired in a keyboard workspace 102. The pull down also contains "Save", "Save as" and "Quit" selections. The present invention also envisions a locked keyboard which could only be accessed in view only mode. Typically, a locked keyboard would be supplied with the keyboard editor 60 itself or with another application program designed for use with the keyboard editor 60. All keyboards can be stored in a library 61 of the keyboard editor 60.

As many of the actions performed by the Keyboard Editor 60 are selected by the user from the pull down menus, a short description of each action as it appears in the preferred embodiment is in order. However, they are not depicted in the FIGS. as they closely resemble the file pull down 110 in FIG. 4.

The edit pull down contains many of the more important key modification actions. Some actions are generic Presentation Manager actions necessary under the CUA guidelines. Those skilled in the art would recognize that other pull downs and other means of selecting these actions are possible, these representing the current preferred embodiment. The first action is Undo which informs the system to revoke the last command. Select All, the second action, selects the entire set of keys for a future operation. The next action, Unselect All, is the opposite. The Cut to Clipboard action, takes the selected keys and cut them to the clipboard, removing them form the keyboard window. The clipboard is a standard device in PM used to translate parts of application program windows. Copy to clipboard is a similar action which does not remove the keys but make a copy of them in the clipboard. Paste from clipboard takes the keys in the clipboard and pastes them into the designated keyboard. The next action, Delete, removes the marked keys for the keyboard space. The eighth action, Move, is used to move selected keys to a new position within the keyboard space or to other keyboard space.

Copy is similar but only a copy of the marked keys are taken to a new location and the original key remains in place. New key is used to create a new key any place touched within a keyboard space. The change key action allows the user to select an existing key and go to the key definitions dialog box to change the existing key parameters. The last action, brings up a dialog box used to align keys within a newly created keyboard space.

In the options pull down, first action is test mode which allows a user to test a keyboard which he has previously designed. The test mode runs the keyboard showing the user the outputs of the keyboard. Fit keys to keyboard actions expands the keys created in the keyboard space and expands them to take most of the space in the keyboard window. The results from this action are generally less than optimal. The verify on delete option if checked will cause the keyboard editor 60 to query the user if a key is deleted whether the user is sure that he wants to delete the key.

Verify align option if selected will query the user whether the last alignment request was what he desired. In the pull down the user can define how he wants the windows displayed on the screen. There is a cascade mode which puts the windows on top of the other. The close all actions option closes all the displays windows. A dialog box is brought up which asks whether any new, unsaved modifications should be save. Under Close All, Presentation Manager lists whatever windows are active in the keyboard editor 60. It will list any new keyboard spaces, preexisting keyboard spaces and any presently displayed dialog boxes. The user can pick which is the active window.

In the preferences pull down, first option is sound which is an option that says when the user strikes keys whether they beep or not. The Typamatic option brings up a dialog box which allows the user to set certain typamatic parameters of the keys defined as typamatic by the keyboard editor such as speed and hold duration.

The help pull down is standard to Presentation Manager. Various selections are listed, the user can select a topic and list box containing information about the aspect of the keyboard editor 60 will pop-up.

The work area 101 can be used to edit an unlimited number of keyboards. Every time a new keyboard is added or an existing keyboard is opened, it is added to the work area 101. By allowing a plurality of keyboards within the work space 101, the user can copy or move keyboard keys from one keyboard space to another by "grabbing" or "dragging" the selected keys. This speeds the time required to create a new keyboard.

The querty keyboard 102 illustrates the two types of keys which are supported by the keyboard editor 60. The first type is a normal key which when pressed provides some sort of action such as sending out a character or a string of characters, i.e. the letter "a" or a virtual key function, i.e. insert, delete, space, etc. Unlike the physical keyboards, the normal keys of a soft keyboard created by the keyboard editor 60 can be set to provide either multiple action on a single key press, the typamatic setting, or a single action per key press. The second type of keys are the state keys, for example, the shift, control, alt or caps lock keys. When depressed, these keys change the state of the keyboard. When a normal key is defined, the action performed by the computer system from a default setting may differ if any of the state keys are pressed. Thus, touching a particular key on a keyboard with the four state keys may cause five different system actions depending on which state key is depressed. The state key can behave in two different modes. The "auto" mode changes the state of the keyboard for a single action by a normal key. Once that action is performed, the original state of the keyboard is reset. "Toggle" mode changes the state of the keyboard indefinitely. Once the state key is pressed, the keyboard state remains changed until the same state key is pressed again.

A group of keys can be selected by stretching a rectangle around the keys in question. In the preferred embodiment, a rectangle is stretched by first defining a first corner of the rectangle by performing a selected action such as a press down on a mouse button at the first corner and holding for a specified duration and then dragging the pointer to the opposite corner of the rectangle and then releasing to set the rectangle selection box. Alternative means of setting the rectangle size such as entering into a select mode and touching each key which is to be placed in the rectangle are possible.

The keyboard editor can also size keys once created. One preferred method of resizing the keys is to create a sizing box around the selected key and then stretch the sizing rectangle to the desired size. Similarly a group of keys may be resized at the same time by forming a sizing box around a group of selected keys and stretching that sizing box to desired size. All the relative placements of the keys within the sizing box will remain the same, but now will be a new size.

At any given time, typically only one window in an integrated operating environment 56 has the "keyboard focus". This window receives the keystrokes which are entered via the hard keyboard. In the preferred embodiment, the keyboard editor 60 uses this behavior to send the actions which result from touches over a keyboard image on the touch sensor by inserting the character strings in the keyboard queue in OS/2. Alternatively, since any application can query PM for the application with the input focus, at any time, the keyboard editor knows which application is receiving its keystrokes. The keyboard editor 60 formulates and sends the appropriate messages to the application with the keyboard focus when the touch sensor over its key images are touched. The application does not know the difference.

The keyboard library 61 is augmented each time the user builds a new keyboard file and stores it. Copying from preexisting keyboards takes advantage of the object oriented approach provided by the integrated operating environment 56. In the following FIGS. keys are copied which have already been described or defined in the QUERTY keyboard 102 into the new keyboard workspace 104. The user can then modify them in size, shape or placement. Further, the character or legend on the key cap can be modified and the result from touching each key.

Figure 5:
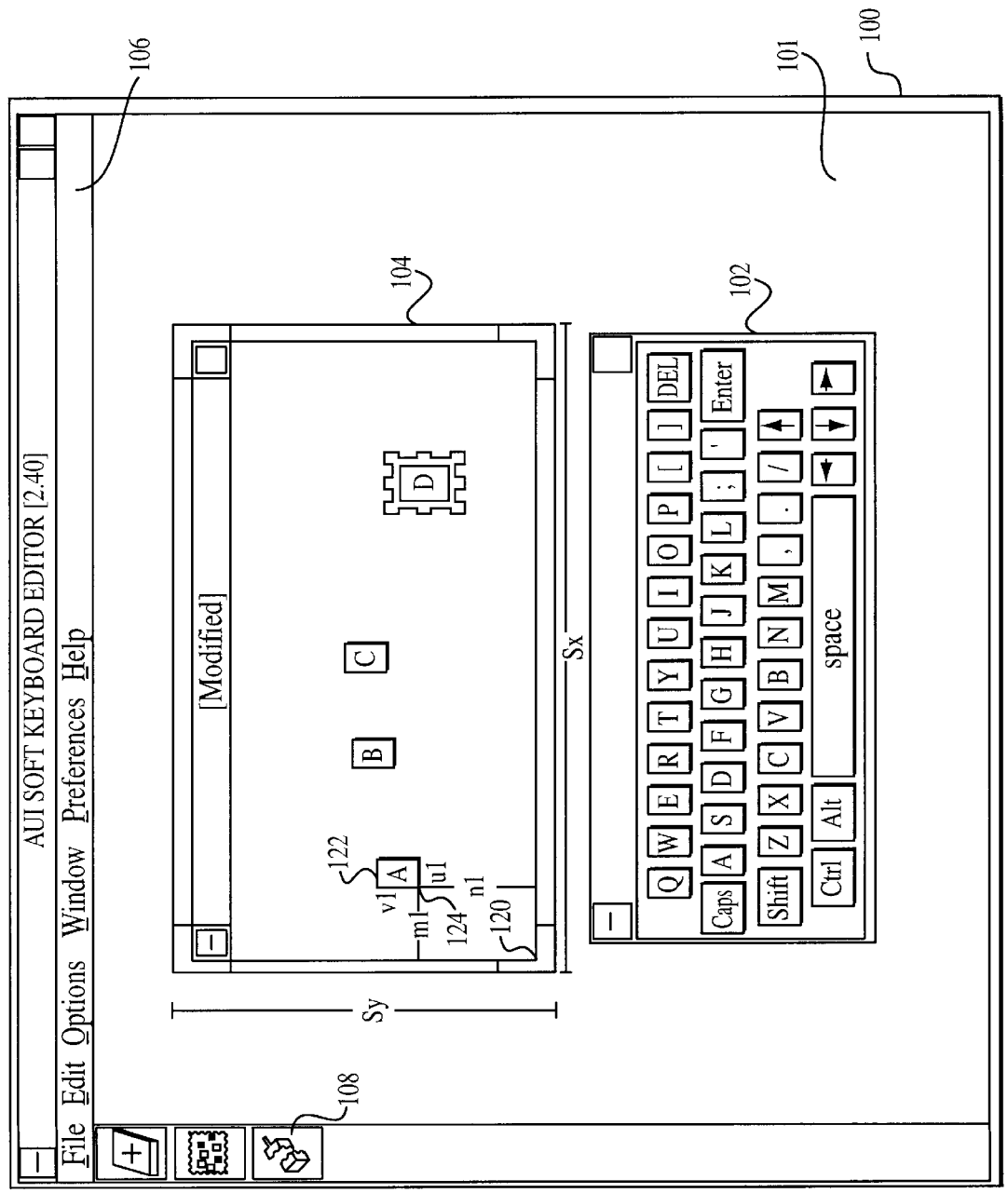
FIG. 5 depicts the keyboard editor as shown in FIG. 3 where four keys have been copied from the previously defined keyboard.

Referring to FIG. 5, the main window 100 is displayed where four keys form the view only keyboard 102 have copied to the new keyboard work area. The keys are labeled A, B, C and D and correspond to the typical character keys on the querty keyboard. The D key has sizing handles which resemble little boxes around it to indicate that it is the "active key" and is still in the state in which it can be manipulated. The user can grab one of the sizing handles around the key image and use it as a size and move the key in the desired direction. This method resemble the way a window is sized in the integrated operating environment. The copy action is selected from edit pull down. To copy the key, the user simply touches the desired key in the preexisting keyboard 102 with his finger and literally drags it across the touch screen and places a copy of the key in the desired location in the new keyboard space 104. Moving a key is similar the user will "grab" the key and "drag" it to the desired position. Keys can be moved from one keyboard to another keyboard, or within the keyboard itself. If a group of keys are selected for a copy or move action, the entire sizing box may be "grabbed" and "dragged" to a new location. The actions of selecting and grabbing are accomplished in the preferred embodiment, simply by touching the touch sensor near the desired key by finger or stylus for a prescribed period of time. Dragging a selected or grabbed key is accomplished by moving the stylus or finger across the touch sensor to the new key position. As the A, B, C, and D keys are already defined in the QUERTY keyboard 102, the user is not automatically interrogated as to the result of touching the keys. The keyboard editor 60 transfers the keyboard legend and the previously defined results to the new key location in the new keyboard space 102. With the touch sensor of U.S. Pat. No. 4,686,332, the dragging operation can be performed by either a stylus or finger. Alternatively, the keyboard design could be done with a mouse or any other pointing device.

As mentioned previously, as the keys are defined, moved and sized their location within the keyboard space is stored. When the keyboard is filed within the library 61 and then invoked by the user, the computer system must determine where any of the keys within the new keyboard space have been touched. This will usually be in a completely different area of the display and touch input device. Therefore, some means of proportionally sizing the key areas within the keyboard space as it is moved across the display must be devised. In the preferred embodiment, each key is a Presentation Manger Push Button, which is a standard window type and which are "child" windows of the window representing the keyboard space. The ability to have multiple windows "owned" by one application is a standard capability of many integrated operating environments. Because the keyboard editor 60 is implemented in Presentation Manager 56, it is able to share responsibility for the display of the keyboard image and the detection of key touches with PM. The keyboard execution unit 63 will look to the appropriate keyboard table for the keyboard image parameters defining placement of the keyboard window and child push buttons within that window and pass these on to PM which will track of key touches in the appropriate place on the display. When the keyboard image is moved or resized PM 56 tells the keyboard editor 60 to perform the necessary calculations to keep the push button proportionately sized and located.

However, if the keyboard editor 60 did not have access to the PM window management system, it could recognize key touches in other ways. The basic approach would be for the keyboard editor to keep a table of the placement of a key in both x and y directions relating a key feature such as the top left corner of a rectangle key to some keyboard origin point and the size of each key as it extends in the x and y direction from the key feature. As the keyboard image is painted, the keyboard editor 60 refers to the table of coordinates which describe the location of each key image. When a touch is detected the application would look up the coordinates of the touch in his table and decide which key had been pressed. As the keyboard is sizable and movable, the application must modify its table each time the keyboard is sized. Thus, the ability to make each key window in an integrated operating environment reduces the amount of code necessary in the editor.

Figure 4:
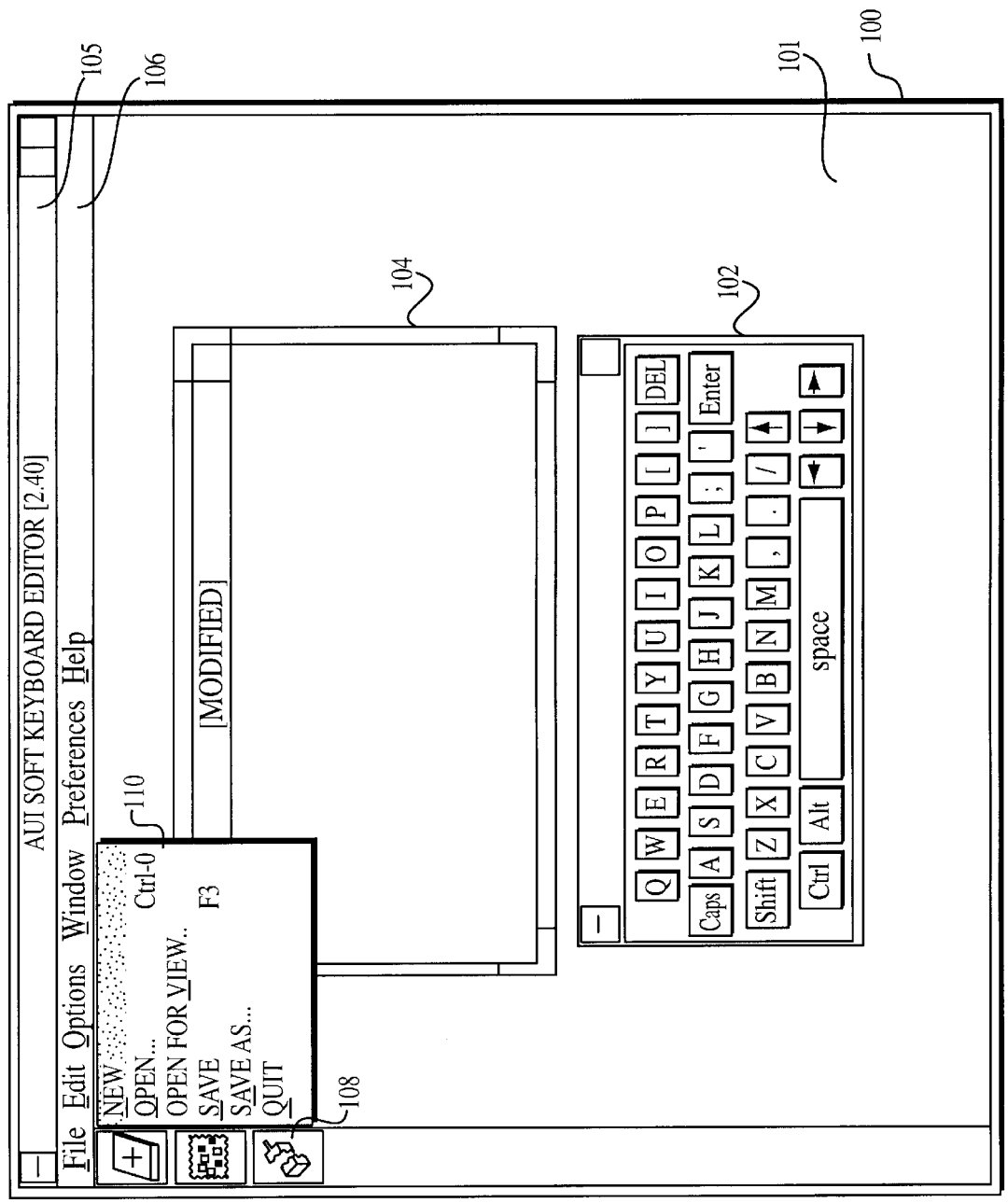
FIG. 4 shows the keyboard editor as shown in FIG. 3 with the "file" pull down.

More generally, the data processing system having a display with an output coupled to a memory, the display having a touch sensing device such as a touch overlay membrane. The touch sensing device will have horizontal and vertical sensing electrodes coupled to the memory to detect the proximity of a stylus or the mechanical touch of a finger or other pointing device. The invention is an apparatus and its method of operation for defining a touch activated keyboard to be displayed on the display. Reference to FIG. 4 will be helpful to understanding the following description.

The method of the invention generally starts by defining a rectangular keyboard space 104 on the display, having a keyboard origin 120 located at a horizontal position value X and a vertical position value Y with respect to an origin for the display and storing the X value and the Y value in a keyboard location register in the memory.

The method of the invention continues by defining a horizontal scale value Sx for the horizontal size of the keyboard space and defining a vertical scale value Sy for the vertical size of the keyboard space and storing the Sx value and the Sy value in a keyboard scale register in the memory.

The method of the invention continues by defining a first rectangular key space the A key 122 on the display, having a first key origin 124 located at a first horizontal position value X+(m1*Sx) and a first vertical position value Y+n1*Sy with respect to the origin for the display and storing the X+m1*Sx value and the Y+n1*Sy value in a first key location register in the memory m1 is the column number and n1 is the row number for key.

The method of the invention continues by defining a first horizontal size value u1*Sx for the horizontal size of the first key space and defining a first vertical size value v1*Sy for the vertical size of the first key space and storing the u1*Sx value and the v1*Sy value in a first key size register in the memory u1 is a size number for the horizontal size of a key and v1 is a size number for the vertical size of a key.

TABLE 1

Example Calculation of Horizontal and Vertical Position Values
and Horizontal and Vertical Size Values
for the Display of a Polygonal Key Space in a Rectangular Keyboad Space
X = 10; Y = 10; Sx = 5; Sy = 5; u1 = 0.8; v1 = 0.8

|  | m1 | n1 | X + (m1*Sx) | Y + (n1*Sy) | u1*Sx | v1*Sy |
|---|---|---|---|---|---|---|
| Row 1, Col 1 | 1 | 1 | 10 + (1*5) = 15 | 10 + (1*5) = 15 | 0.8*5 = 4 | 0.8*5 = 4 |
| Row 1, Col 2 | 1 | 2 | 10 + (1*5) = 15 | 10 + (2*5) = 20 | 0.8*5 = 4 | 0.8*5 = 4 |
| Row 2, Col 1 | 2 | 1 | 10 + (2*5) = 20 | 10 + (1*5) = 15 | 0.8*5 = 4 | 0.8*5 = 4 |

The method of the invention continues by defining a first legend image for the first key space, identified by a first legend code and storing the first legend code in a first legend register in the memory.

The method of the invention continues by defining a first action the first key space, identified by a first action code and storing the first action code in a first action register at a first address having a first address value in the memory.

In order to relate the sensing values output by the sensing device with the corresponding position of touch on the display, a calibration step is required. This step can be performed at any phase prior to the computation of the horizontal and vertical range in the next step below. The method of the invention would typically calibrate a first relationship between horizontal sensing values of the touch sensing device and horizontal positions on the display and calibrate a second relationship between vertical sensing values of the touch sensing device and vertical positions on the display.

Then the next step of the method is computing a first horizontal range of horizontal sensing values of the touch sensing device from the first relationship, using the first horizontal position value and the first horizontal size value, and computing a first vertical range of vertical sensing values of the touch sensing device from the second relationship, using the first vertical position value and the first vertical size value, and storing the first horizontal range, the first vertical range and the first address value in a range table in the memory.

The method of the invention continues by sensing a touch on the touch sensing device by receiving a first horizontal sensing value and a first vertical sensing value.

The method of the invention continues by determining that the first horizontal sensing value is within the first horizontal range and determining determining that the first vertical sensing value is within the first vertical range.

The method of the invention continues by accessing the first address value in the range table.

The method of the invention continues by accessing the first action code using the first address value and performing the first action.

By constructing the keyboard space in this manner, the user can stretch or shrink the shape of the keyboard space and the key spaces enclosed within it will also change their shape to maintain the same geometrical relationship with the keyboard space.

When the user changes the size of the keyboard space, the method of the invention changes the magnitude of the horizontal scale value Sx and the vertical scale value Sy.

The method of the invention continues by computing a new first horizontal size value u1*Sx for the horizontal size of the first key space and computing a new first vertical size value v1*Sy for the vertical size of the first key space.

The method of the invention continues by displaying a new first key space having the new first horizontal size value and the new first vertical size value.

In addition, if the user changes the location of the keyboard space, the method of the invention changes the location of the enclosed key spaces.

When the user changes the location of the keyboard space, the method of the invention changes the magnitude of the first horizontal position value X and the first vertical position value Y.

The method of the invention continues by calculating a new first horizontal position value X+m1*Sx and a new first vertical position value Y+n1*Sy for the location of the first key space.

The method of the invention continues by displaying a new first key space having the new first horizontal position value and the new first vertical position value.

The method of the invention enables the user to transport a key definition to other keyboards or to other systems. The method of the invention does this by forming a first key space record in the memory which includes the contents of the first key location register, the first key size register, the first legend register and the first action register. The user can then transfer the first key space record for use in a second keyboard space. The first key space record may be stored on a permanent storage medium.

The method of the invention enables a variety of actions to be performed when a key space is touched. For example the first action can be the outputting of an alphanumeric character, such as an "a".

The definition of the action can be changed by providing alternate actions when the user presses a state key at the same time as the key space. A state key can be the shift key, the Alt key, the Control key, or the Caps Lock key, for example. Pressing the shift key when the key space is pressed can also be defined to output the capital "A" character, instead of the lower case "a". Instead of outputting a character, the first action can be the execution of stored executable instructions, such as a sequence of macro instructions to insert a blank line in a paragraph of text.

Multiple key spaces can be defined within the keyboard space in the same manner and they can be mutually aligned in both the vertical and horizontal directions or alternately, they can be randomly positioned inside the keyboard space.

When the location or the size of a key space is changed, the relationship with the touch sensing device must also be changed. When the user changes the location of the first key space with respect to the keyboard space, the method of the invention changes the magnitude of the m1 and n1 values.

The method then continues by calculating a new first horizontal position value X+m1*Sx and a new first vertical position value Y+n1*Sy for the new location of the first key space.

The method then continues by computing a new first horizontal range of horizontal sensing values of the touch sensing device from the first relationship, using the new first horizontal position value and the first horizontal size value, and computing a new first vertical range of vertical sensing values of the touch sensing device from the second relationship, using the new first vertical position value and the first vertical size value, and storing the new first horizontal range, the new first vertical range and the first address value in the range table in the memory.

When the user changes the location of the keyboard space, the method of the invention changes the magnitude of the first horizontal position value X and the first vertical position value Y.

The method continues by calculating a new first horizontal position value X+m1*Sx and a new first vertical position value Y+n1*Sy for the location of the first key space.

The method the continues by computing a new first horizontal range of horizontal sensing values of the touch sensing device from the first relationship, using the new first horizontal position value and the first horizontal size value, and computing a new first vertical range of vertical sensing values of the touch sensing device from the second relationship, using the new first vertical position value and the first vertical size value, and storing the new first horizontal range, the new first vertical range and the first address value in the range table in the memory.

Figure 6:
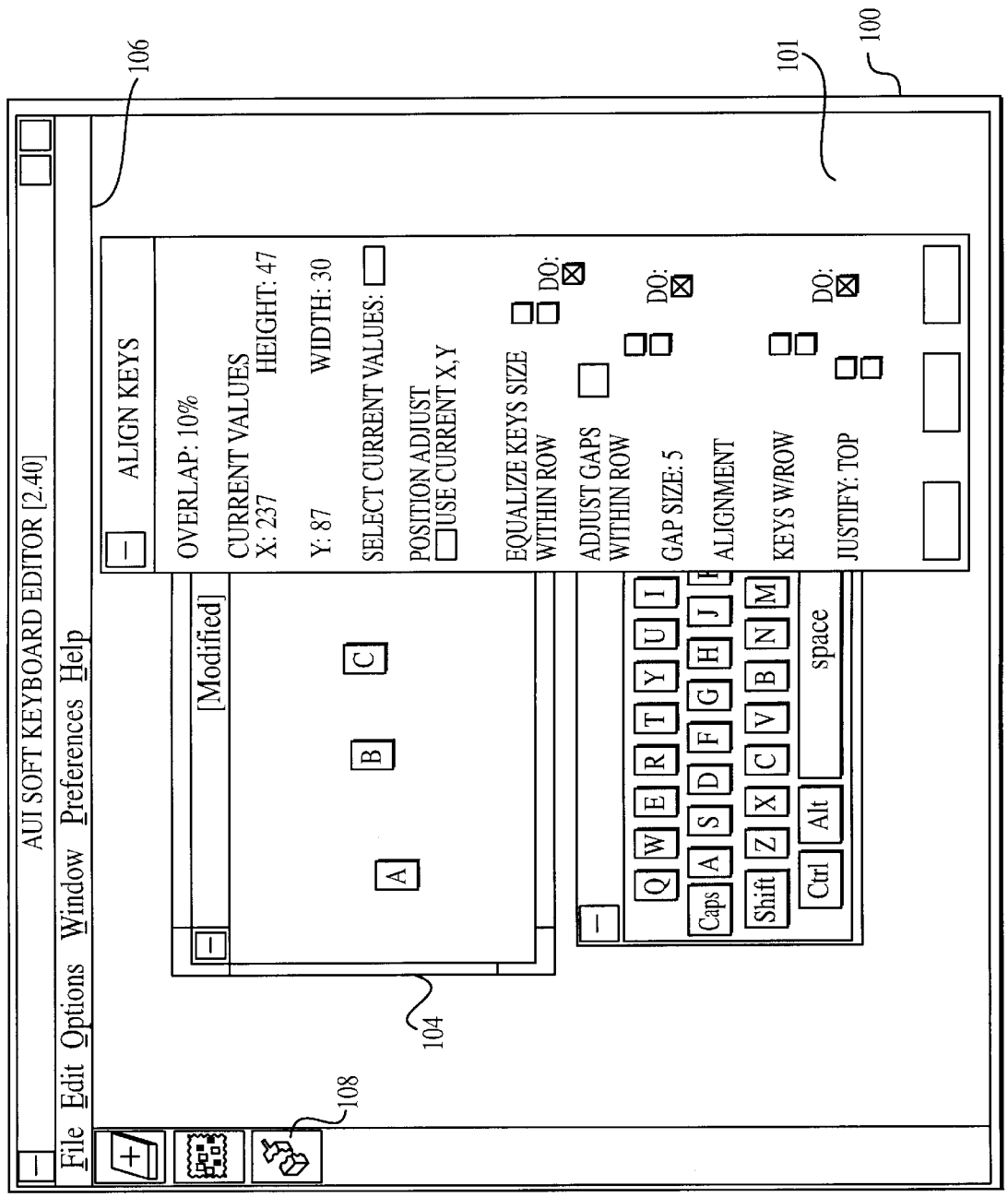
FIG. 6 is a representation of a dialog box which appears after selecting the align keys icon from the options pull-down.

FIG. 6 depicts a dialog box in which to align the keys generated in FIG. 5. The align keys function is found under the edit pull down. The Dialog box is basically a layout tool to help the user align a group of keys which he has placed in the keyboard work area 104 by hand and is part of the keyboard designer 62. It is quite likely that they are misaligned in both vertical and horizontal directions. The Keyboard Editor 60 provides keys for the user. The dialog box presents several options such as key size adjustment for both the height and the width within rows or column, position adjustment in both directions X or Y directions to make the keys lineup, gap size adjustment between the keys within row or columns and setting the overlay percentage to indicate how much the keys should overlap before the Keyboard Editor 60 will consider them to be in the same row or column. If the user selects the adjustment option indicating to adjust key size within the row, the Keyboard Editor 60 will use the size of the left most key as the default value to make them equal. Within a column, the bottom most key is used. An alternative implementation would have the user designate which key in the row or column to use. If the user picks the position adjustment option indicating adjust X position, the Keyboard Editor would line the keys up in a column by sliding the keys only in the X direction to form columns or lined up keys. If the user chooses to adjust the Y position, the keys will be lined up in rows.

Figure 8:
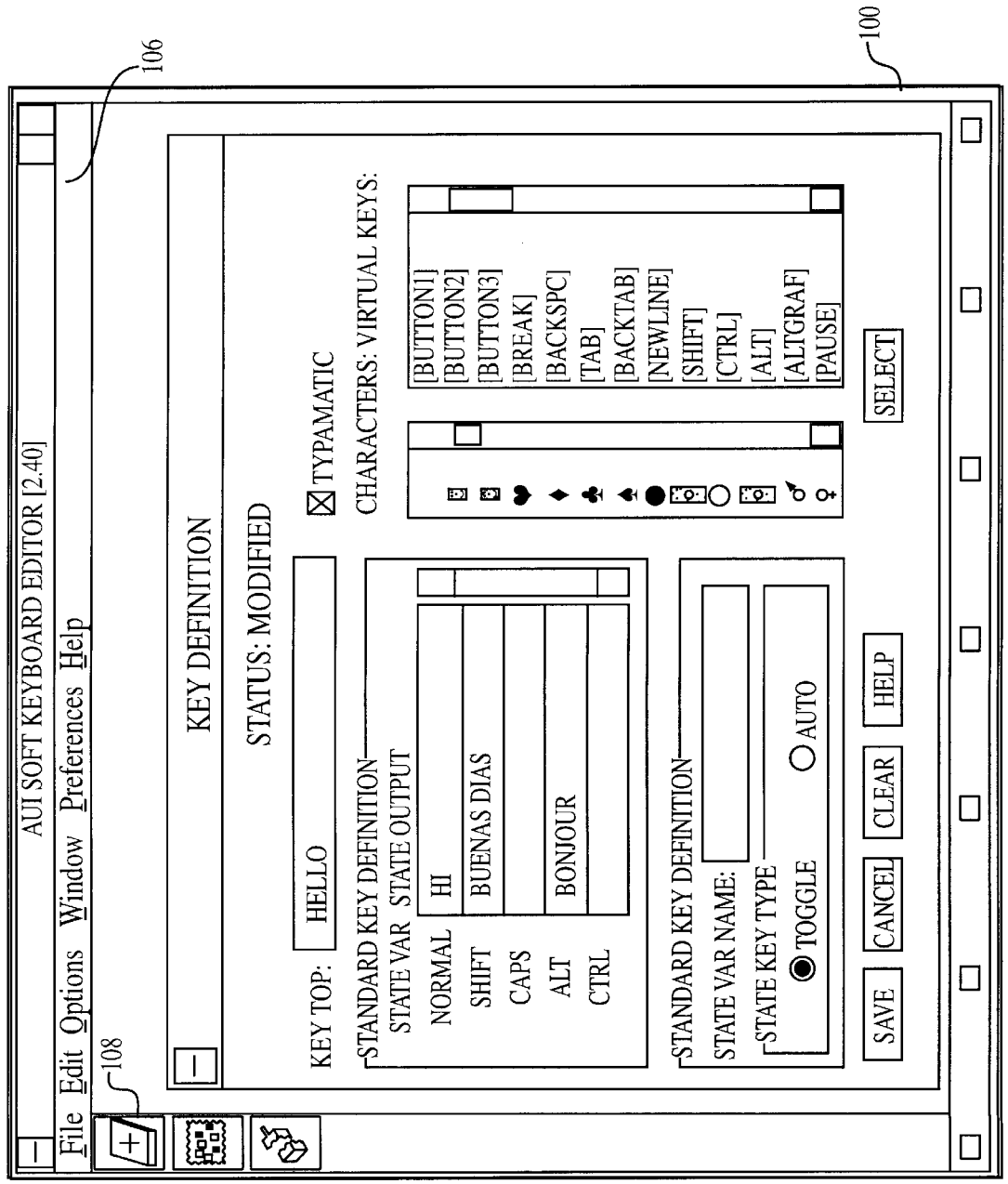
FIG. 8 represents a dialog box which appears when the user creates and places a new key on the new keyboard.

FIG. 8 the dialog box for key definition, will pop-up after copying a key over from an existing keyboard. The user may also enter the key definition dialog box. If the new key function is used, the dialog box will pop-up automatically. The dialog box is used to define to the computer system the traits of that key.

The key definition dialog box shown in FIG. 8 is divided into four main areas:

Key top: This area allows the user to define the key legend which will be displayed as the key top of the key. Preferably, it should be descriptive of the action taken by the key when touched. In this example, the user has defined the key legend as the ascii character string "HELLO". Under the current version of the keyboard editor 60, any combination of the 255 ascii characters may be used as the key legend. The user of a graphics program in conjunction with the keyboard editor would allow for even greater variety of key tops.

Standard key definition: This area allows the user to define the actions of a normal key. In addition to the normal or default state of the keyboard, there are entry fields for the various states such as alt, control, shift, etc. which the keyboard can attain. In FIG. 8, the alphanumeric character string "HI" will be passed to the active application if the HELLO key is touched in the default state. If the shift key has been touched, the character string "BUENAS DIAS" will be passed, if the HELLO key is touched. If the keyboard state has been changed by the alt key, tracking the HELLO key will cause the character string "BONJOUR" to be output.

State key definition: This area allows the user to define the new key as a state key which will change the keyboard to a particular state when touched and change all of the new normal keys to that state. The same key cannot be both a normal key and a state key and entries will not be found in both the standard key definition and state key definition areas. As the HELLO key has been previously defined as a normal key, no entry is found in this area.

The available characters/virtual keys: This area contains two scrollable list boxes, the left list box contains all the ascii printable characters, the right list box contains the text representation of the available virtual keys. These lists provide a means of allowing the user to copy previously defined output or actions with which the keyboard editor 60 is already familiar. A list of previously defined system menus might also be included in a third scrollable list box. There are certain keys which when pressed have specific outputs known to the system rather than a text string. When defined for example, a shift key the user can not simply type the characters "shift" in the definition, because the Keyboard Editor will put out the character string, "shift" which is not what the user intended. The control, the alt, the break key, the backspace, the tab, are all special keys with specific behaviors. For ease of use, the words describing the function are bracketed in the list and predefined in the keyboard editor 60. It is a user friendly way of hiding the codes from the end user. For more choices the user simply scrolls down the list using the scroll bar as there are more choices than can fit on one screen. The list of ascii characters on the left are actual output characters. If the user wants to output those characters which are not alphanumeric characters, the user just picks them from the list with the stylus or finger puts them in a definition space. They can be used for control functions or just for the graphics.

As shown in the FIG. 8, the HELLO key only gives examples of alphanumeric strings as output, but the design allows for system macros or program invocations as well, e.g., run Lotus 1-2-3 or a system macro name.

The dialog box also provides means for the user to indicated whether there is a typamatic key. The typamatic keys will keep repeating if the user holds it down. Certain parameters such as how long a key must be held to initiate typamatic action and how quickly the key will repeat can be set form another dialog box. If the key is an automatic type, the user will generate a single character no matter how long the key is held.

Then on the bottom of this we have, save, cancel, clear, help and select push buttons which are typical PM type functions. Save will store the recently created or modified key definition; cancel will throw it away. Clear will start the key definitions process again clearing the entries which the user has made so far. Help calls up help text. Select is used for entering the special characters and the key output in the list boxes into a key definition space. The user will point to the definition space, point to the special character desired and then touch the select push button.

Figure 7:
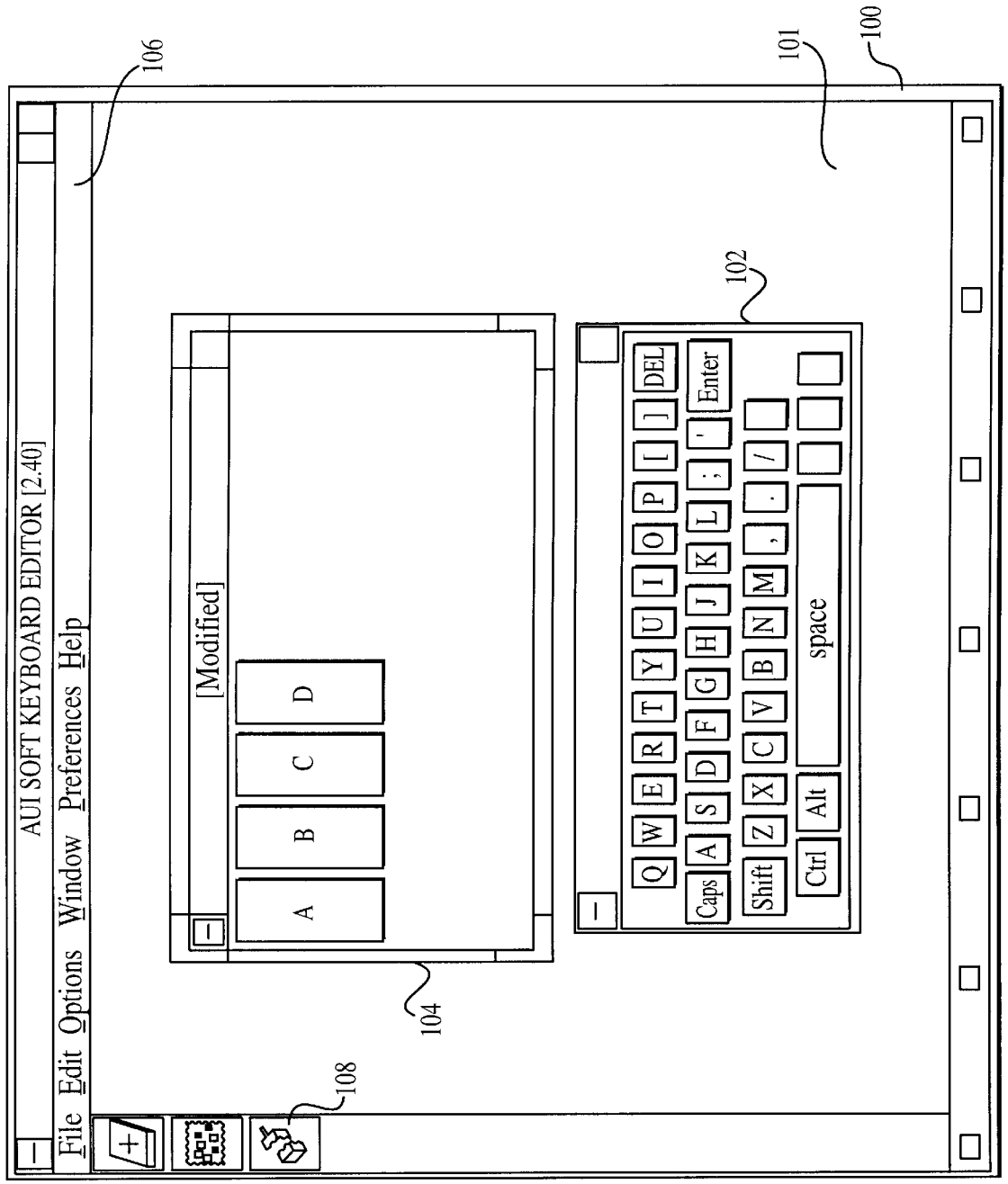
FIG. 7 represents the keyboard editor in FIG. 4 after the align keys function have been performed on the new keyboard.
Figure 9:
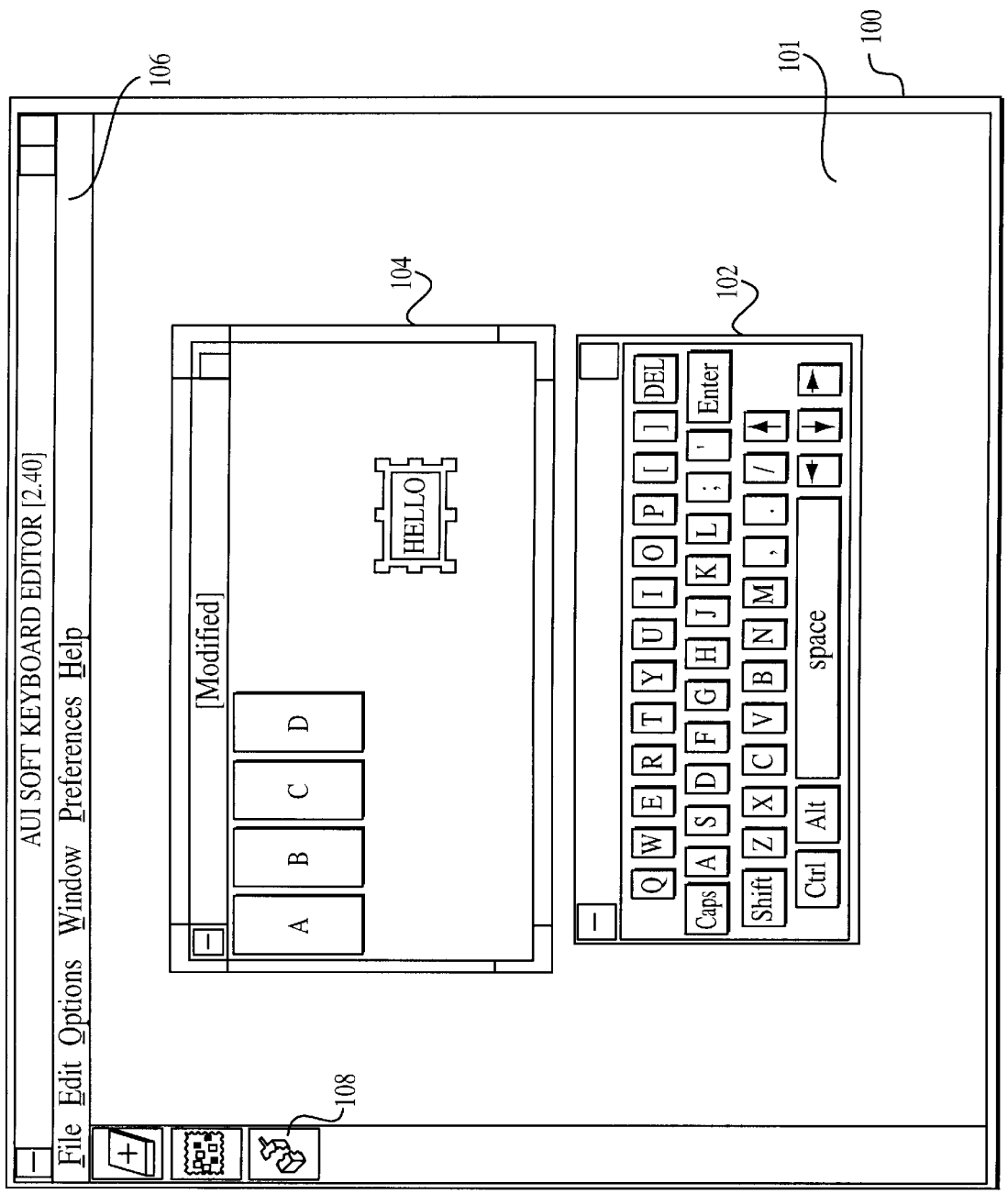
FIG. 9 represents the keyboard editor after the key in FIG. 8 is defined.

FIG.9 depicts the keyboard window which is the result after defining the HELLO in FIG. 8 key onto the new keyboard shown in FIG. 7. The new key is shown with the character string "HELLO" as the key legend defined in FIG. 8. Notice that the sizing handles are still the new key as it remains the active key, so further manipulation in position is possible is desired.

Additional state keys "shift" and "alt" are copied from the QUERTY keyboard 102 into the new keyboard space 104 to allow the user to test all the functions defined for the HELLO key defined in FIG. 8. The new state keys in the keyboard 102 are depicted in FIG. 10.

Figure 10:
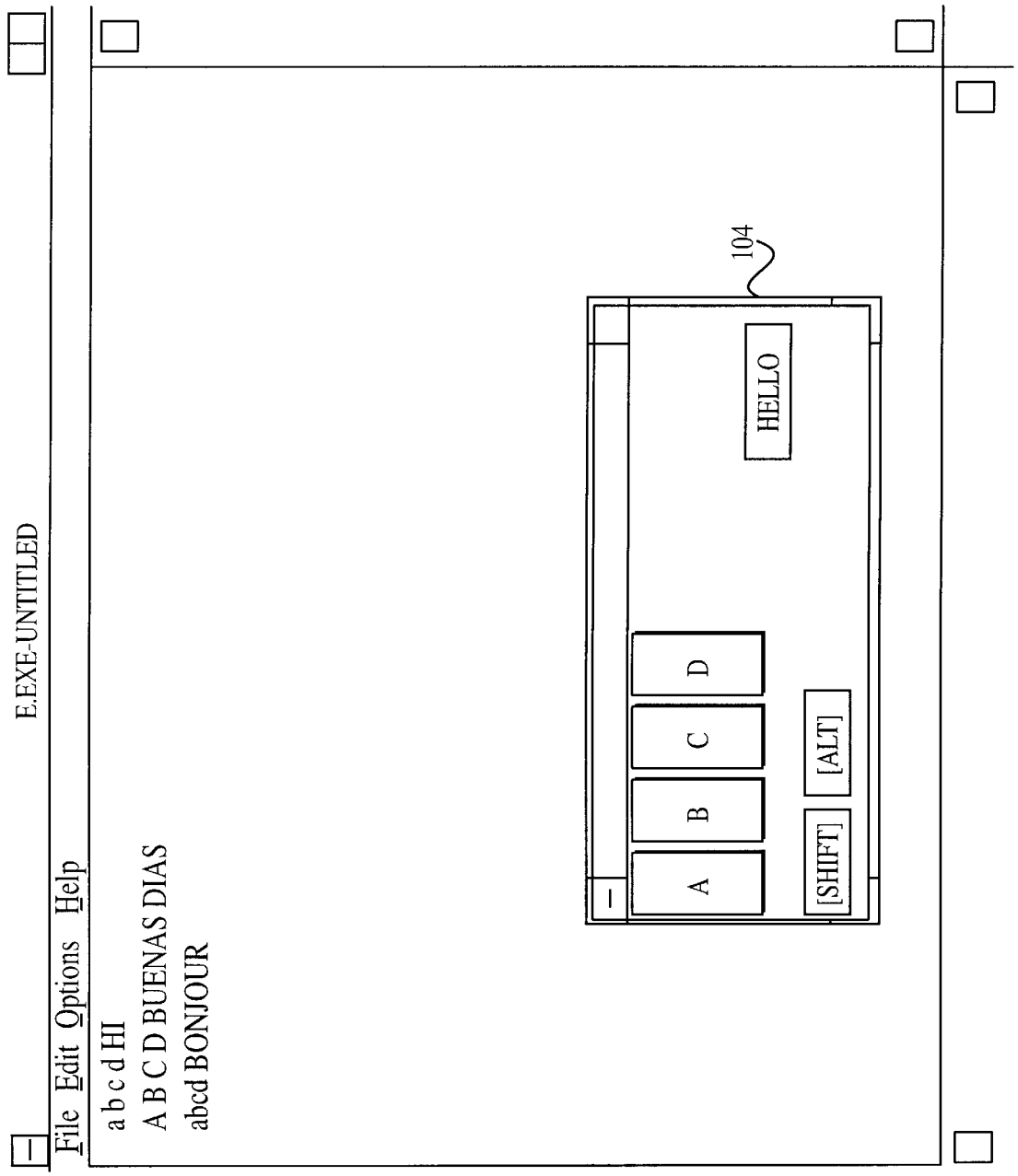
FIG. 10 is a representation of the new keyboard running under the test option, typing into a system editor.

FIG. 10 depicts test mode pull down menu under options in the action bar. Without the shift and alt keys on the new keyboard 104, it is not possible to test any key built that puts out a different output if those state keys are touched. In the test window the results are shown. The first line results from hitting the keys "a b c d hello" in normal mode shown as "a b c d HI". The next line depicts the results for hitting the shift key and then hit "a b c d hello" in shift state and receive "A B C D BUENAS DIAS". The last line shows the keys in alt state and it comes out "a b c d".

The keyboard execution unit (KEU) 63, is called by the Advanced User Interface 70 if the user makes a gesture which calls for a keyboard. The KEU 63 registers itself with AUI 70 when it is loaded so that AUI 70 knows it is already loaded. If the KEU is not loaded, AUI will load it then pass it the name of the keyboard to display. Another way that a keyboard may be displayed is if an aware application uses the AUI 70 to request a keyboard. Once again, AUI 70 calls (or loads) the KEU 60 and passes it the keyboard name. Once displayed, a keyboard is a system resource, the same way the hard keyboard 30 is, and is not associated with any application.

One advantage in using the touch sensor as described in the U.S. Pat. No. 4,686,332 patent, is the power in being able to tell the difference between finger and stylus. One could in this program or any other AUI Workpad program issue commands by performing the exact same action on the screen with either finger or stylus and have them interpreted differently. On of the ways in which the execution of the keyboard is accomplished is to make a gesture on the touch sensor that has been previously been assigned to bring up a particular keyboard. Most of the time when working with touch activated keyboards, the keyboard should be slightly larger if the user if working with the finger as opposed to the stylus. The finger is a blunter instrument. One of the things which can be done quite easily to indicate that if the gesture is made with a finger, then the keyboard will come up in larger size than if the same gesture is made with the stylus.

While in a typical PM application, the three indications of the user's focus of attention, the visual position the top window position, the active window status and the input focus window status are usually linked to the same application, they are three separate qualities and can be associated with different applications running in Presentation Manager 56. When the keyboard execution unit 63 is invoked, the keyboard editor 60 is a somewhat unusual application as it is never the active application nor does it receive the input focus, but it always attempts to keep itself in the top window position.

To select a key, the user touches the touch sensor 32 over an image of the keyboard presented on display 20. The touch sensor 32 sends the touch event to the touch driver 47, passes it up to the operating system 50 and the integrated operating environment 56, through the alternative input subsystem 71 which converts it to an emulated mouse event. The integrated operating environment 56 delivers it to the soft keyboard execution unit 63 with any required translation being performed by the Advanced User Interface 70. The keyboard execution unit 63 would then determine which keyboard character string or other output to playback depending upon which key in the keyboard window the user had touched. One of the advantages of writing the keyboard for an integrated operating environment is that the keys can be defined as children windows of the main keyboard window. The integrated operating environment can determine which window, and therefore which key has been touched by the user. Alternatively, the keyboard execution unit 63 would have to make this determination. The character string would then be fed back through the operating system 50 and placed in the single queue of keystrokes that will be delivered to the application window that currently has the keyboard focus. If a spreadsheet currently had the keyboard focus and was currently the active window, the user could touch the touch input device over the "3" key in a numeric pop-up keyboard image. The keyboard execution unit 63 would transmit an ascii "3" character into the keyboard queue in OS/2 50 and it would be delivered to the spreadsheet with the keyboard focus.

The keyboard designer 62 compiles a certain number of keys and their relative positions in the keyboard window, which will provide the keyboard image. In PM those keys themselves are in fact individual windows. Since the keys are child windows of the keyboard window, the keyboard execution is freed from determining the position of the touch. PM 56 will know which keyboard window has been touched and deliver the message to the keyboard execution unit 63. Then, with identity of the touched key, the execution unit 63 can generate keystrokes by looking up the corresponding keystrokes and sending them to the focus windows.

When the user touches one of the buttons, the parent of the button gets notified that a specific key has been touched with a WM control message. The ID of the key is passed along in that message. The ID is then looked up in the table to determine what the keystrokes should be that are played back to which ever other window has the focus. That may be a single key or may be multiple keystrokes, the string, International Business Machines Corporation, and the keytop is displayed as IBM.

That table is built from the compiled version of the keyboard that was built as the keyboard editor. The output of the keyboard designer is a table. When the table is read in by the keyboard execution unit, the table contains the XY coordinates and the height and width of each key and those translate into building children windows in the visual keyboard image.

Figure 11:
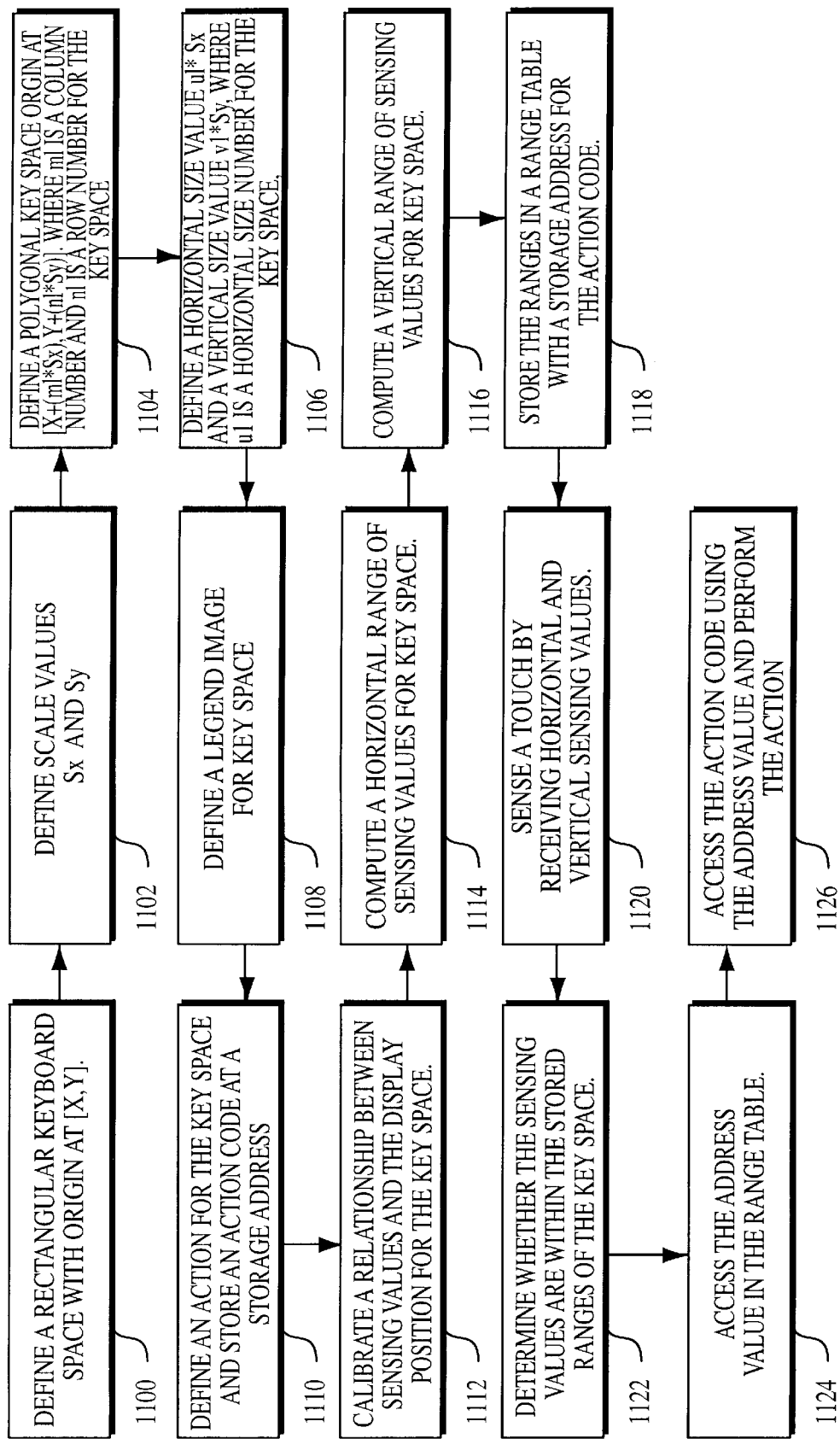
FIG. 11 is flow diagram of the method of the invention.

FIG. 11 is a example flow diagram of the method of the invention, comprising steps 1100 to 1126 as follows.

Step 1100: define a rectangular keyboard space with origin at [X,Y].

Step 1102: define scale values Sx and Sy.

Step 1104: define a polygonal key space origin at [X+(m1*Sx),Y+(n1*Sy)], where m1 is a column number and n1 is a row number for the key space.

Step 1106: define a horizontal size value u1*Sx and a vertical size value v1*Sy, where u1 is a horizontal size number and v1 is a vertical size number for the key space.

Step 1108: define a legend image for key space.

Step 1110: define an action for the key space and store an action code at a storage address.

Step 1112: calibrate a relationship between sensing values and the display position for the key space.

Step 1114: compute a horizontal range of sensing values for key space.

Step 1116: compute a vertical range of sensing values for key space.

Step 1118: store the ranges in a range table with a storage address for the action code.

Step 1120: sense a touch by receiving horizontal and vertical sensing values.

Step 1122: determine whether the sensing values are within the stored ranges of the key space.

Step 1124: access the address value in the range table.

Step 1126: access the action code using the address value and perform the action.

This concludes the example flow diagram of FIG. 11.

While the invention has been described with reference to a preferred embodiment, it will be understood by those skilled in the art that various changes can be made to the architecture without departing from the spirit and scope of the invention. Accordingly, the invention shall be limited only as specified in the following claims.

We claim:

1. In a data processing system having display output coupled to a memory including a keyboard editor and having a touch sensing means with horizontal and vertical sensing electrodes coupled to said memory, a method for defining a touch activated keyboard using the keyboard editor to size, re-size, store and move the keyboard any where on the display, comprising the steps of:

defining a rectangular keyboard space on the display as an original touch activated keyboard, the keyboard space having a keyboard origin located at a horizontal position value X and a vertical position value Y with respect to an origin for the display and storing said X value and said Y value in a keyboard location register in said memory;

defining a horizontal scale value Sx for the horizontal size of said keyboard space and defining a vertical scale value Sy for the vertical size of said keyboard space and storing said Sx value and said Sy value in a keyboard scale register in said memory;

defining a first polygonal key space on the display, having a first key origin located at a first horizontal position value X+(m1*Sx) and a first vertical position value Y+(n1*Sy) with respect to said origin for the display and storing said X+(m1*Sx) value and said Y+(n1*Sy) value in a first key location register in said memory, where m1 is a column number and n1 is a row number on the display;

defining a first horizontal size value u1*Sx for the horizontal size of said first key space and defining a first vertical size value v1*Sy for the vertical size of said first key space and storing said u1*Sx value and said v1*Sy value in a first key size register in said memory, where u1 is a horizontal size number and v1 is a vertical size number for said first key space;

defining a first legend image for said first key space, identified by a first legend code and storing said first legend code in a first legend register in said memory;

forming a key definition window in the display;

defining a keyboard function for said first key space using the key definition window, the function identified by a first action code and storing said first action code in a first action register at a first address having a first address value in said memory;

calibrating a first relationship between horizontal sensing values of the touch sensing means and horizontal positions on the display and calibrating a second relationship between vertical sensing values of the touch sensing means and vertical positions on the display;

computing a first horizontal range of horizontal sensing values of the touch sensing means from said first relationship, using said first horizontal position value and said first horizontal size value, and computing a first vertical range of vertical sensing values of the touch sensing means from said second relationship, using said first vertical position value and said first vertical size value, and storing said first horizontal range, said first vertical range and said first address value in a range table in said memory;

storing the original touch activated keyboard in a library in the memory; or sensing a touch on the touch sensing means by receiving a first horizontal sensing value and a first vertical sensing value;

determining that said first horizontal sensing value is within said first horizontal range and determining that said first vertical sensing value is within said first vertical range;

accessing said first address value in said range table; and p1 accessing said first action code using said first address value and performing said first action which provides an output from the system as a simple or complex combination of characters.

2. The method of claim 1, which further comprises:

changing the size of said keyboard space and changing the magnitude of said horizontal scale value Sx and said vertical scale value Sy;

computing a new first horizontal size value u1*Sx for the horizontal size of said first key space and computing a first vertical size value v1*Sy for the vertical size of said first key space;

displaying a new first key space having said new first horizontal size value and said new first vertical size value.

3. The method of claim 1, which further comprises:

changing the location of said keyboard space and changing the magnitude of said first horizontal position value X and said first vertical position value Y;

calculating a new first horizontal position value X+m1*Sx and a new first vertical position value Y+n1*Sy for the location of said first key space;

displaying a new first key space having said new first horizontal position value and said new first vertical position value.

4. The method of claim 1 wherein said first key space record is stored on a permanent storage medium.

5. The method of claim 1, wherein said first action is the outputting of an alphanumeric character.

6. The method of claim 1, wherein said first action is the execution of a stored executable instructions.

7. The method of claim 1, which further comprises:

defining a second polygonal key space on the display, having a second key origin located at a second horizontal position value X+(m2*Sx) and a second vertical position value Y+(n2*Sy) with respect to said origin for the display and storing said X+(m2*Sx) value and said Y+(n2*Sy) value in a second key location register in said memory;

defining a second horizontal size value u2*Sx for the horizontal size of said second key space and defining a second vertical size value v2*Sy for the vertical size of said second key space and storing said u2*sx value and said v2*Sy value in a second key size register in said memory;

defining a second legend image for said second key space, identified by a second legend code and storing said second legend code in a second legend register in said memory;

defining a second action said second key space, identified by a second action code and storing said second action code in a second action register at a second address having a second address value in said memory;

computing a second horizontal range of horizontal sensing values of the touch sensing means from said first relationship, using said second horizontal position value and said second horizontal size value;

computing a second vertical range of vertical sensing values of the touch sensing means from said second relationship, using said second vertical position value and said second vertical size value;

storing said second horizontal range, said second vertical range and said second address value in a range table in said memory;

sensing a touch on the touch sensing means by receiving a second horizontal sensing value and a second vertical sensing value;

determining that said second horizontal sensing value is within said second horizontal range and determining that said second vertical sensing value is within said second vertical range;

accessing said second address value in said range table; and accessing said second action code using said second address value and performing said second action.

8. The method of claim 7, which further comprises:

aligning said first key space with said second key space.

9. The method of claim 1, which further comprises:

changing the location of said first key space with respect to said keyboard space and changing the magnitude of said m1 and n1 values;

calculating a new first horizontal position value X+m1*Sx and a new first vertical position value Y+n1*Sy for the new location of said first key space;

computing a new first horizontal range of horizontal sensing values of the touch sensing means from said first relationship, using said new first horizontal position value and said first horizontal size value, and computing a new first vertical range of vertical sensing values of the touch sensing means from said second relationship, using said new first vertical position value and said first vertical size value, and storing said new first horizontal range, said new first vertical range and said first address value in said range table in said memory.

10. The method of claim 1, which further comprises:

changing the location of said keyboard space and changing the magnitude of said first horizontal position value X and said first vertical position value Y;

calculating a new first horizontal position value X+m1*Sx and a new first vertical position value Y+n1*Sy for the location of said first key space;

computing a new first horizontal range of horizontal sensing values of the touch sensing means from said first relationship, using said new first horizontal position value and said first horizontal size value, and computing a new first vertical range of vertical sensing values of the touch sensing means from said second relationship, using said new first vertical position value and said first vertical size value, and storing said new first horizontal range, said new first vertical range and said first address value in said range table in said memory.

11. In a data processing system having display output coupled to a memory including a keyboard editor and having a touch sensing means with horizontal and vertical sensing electrodes coupled to said memory, a system for defining a touch activated keyboard using the keyboard editor to size, re-size, store and move the keyboard any where on the display, comprising:

means for defining a rectangular keyboard space on the display as an original touch activated keyboard, the keyboard space having a keyboard origin located at a horizontal position value X and a vertical position value Y with respect to an origin for the display and storing said X value and said Y value in a keyboard location register in said memory;

means for defining a horizontal scale value Sx for the horizontal size of said keyboard space and defining a vertical scale value Sy for the vertical size of said keyboard space and storing said Sx value and said Sy value in a keyboard scale register in said memory;

means for defining a first polygonal key space on the display, having a first key origin located at a first horizontal position value X+(m1*Sx) and a first vertical position value Y+(n1*Sy) with respect to said origin for the display and storing said X+(m1*Sx) value and said Y+(n1*Sy) value in a first key location register in said memory, where m1 is a column number and n1 is a row number on the display;

means for defining a first horizontal size value u1*Sx for the horizontal size of said first key space and defining a first vertical size value v1*Sy for the vertical size of said first key space and storing said u1*Sx value and said v1*Sy value in a first key size register in said memory, where u1 is a horizontal size number and v1 is a vertical size number for said first key space;

means for defining a first legend image for said first key space, identified by a first legend code and storing said first legend code in a first legend register in said memory;

forming a key definition window in the display;

defining a keyboard function for said first key space using the key definition window, the function identified by a first action code and storing said first action code in a first action register at a first address having a first address value in said memory;

means for calibrating a first relationship between horizontal sensing values of the touch sensing means and horizontal positions on the display and calibrating a second relationship between vertical sensing values of the touch sensing means and vertical positions on the display;

means for computing a first horizontal range of horizontal sensing values of the touch sensing means from said first relationship, using said first horizontal position value and said first horizontal size value, and computing a first vertical range of vertical sensing values of the touch sensing means from said second relationship, using said first vertical position value and said first vertical size value, and means for storing said first horizontal range, said first vertical range and said first address value in a range table in said memory;

means for forming a first key space record in said memory which includes the contents of the first key location register, said first key size register, said first legend register and said first action register;

means for transferring said first key space record for use in a second keyboard space;

storing the original touch activated keyboard in a library in the memory; or means for sensing a touch on the touch sensing means by receiving a first horizontal sensing value and a first vertical sensing value;

means for determining that said first horizontal sensing value is within said first horizontal range and determining that said first vertical sensing value is within said vertical range;

means for accessing said first address value n said range table; and means for accessing said first action code using said first address value and performing said first action which provides an output from the system as a simple or complex combination of characters.

12. The system of claim 11, which further comprises:

means for changing the size of said keyboard space and changing the magnitude of said horizontal scale value Sx and said vertical scale value Sy;

means for computing a new first horizontal size value u1*Sx for the horizontal size of said first key space and computing a first vertical size value v1*Sy for the vertical size of said first key space;

means for displaying a new first key space having said new first horizontal size value and said new first vertical size value.

13. The system of claim 11, which further comprises:

means for changing the location of said keyboard space and changing the magnitude of said first horizontal position value X and said first vertical position value Y;

means for calculating a new first horizontal position value X+m1*Sx and a new first vertical position value Y+n1*Sy for the location of said first key space;

means for displaying a new first key space having said new first horizontal position value and said new first vertical position value.

14. The system of claim 11 wherein said first key space record is stored on a permanent storage medium.

15. The system of claim 11, wherein said first action is the outputting of an alphanumeric character.

16. The system of claim 11, wherein said first action is the execution of a stored executable instructions.

17. The system of claim 11, which further comprises:

means for defining a second polygonal key space on the display, having a second key origin located at a second horizontal position value X+(m2*Sx) and a second vertical position value Y+(n2*Sy) with respect to said origin for the display and storing said X+(m2*Sx) value and said Y+(n2*Sy) value in a second key location register in said memory, where m2 is a column number and n2 is a row number on the display;

means for defining a second horizontal size value u2*Sx for the horizontal size of said second key space and defining a second vertical size value v2*Sy for the vertical size of said second key space and storing said u2*Sx value and said v2*Sy value in a second key size register in said memory, where u2 is a horizontal size number and v2 is a vertical size number for said second key space;

means for defining a second legend image for said second key space, identified by a second legend code and storing said second legend code in a second legend register in said memory;

means for defining a second action said second key space, identified by a second action code and storing said second action code in a second action register at a second address having a second address value in said memory;

means for computing a second horizontal range of horizontal sensing values of the touch sensing means from said first relationship, using said second horizontal position value and said second horizontal size value;

computing a second vertical range of vertical sensing values of the touch sensing means from said second relationship, using said second vertical position value and said second vertical size value;

storing said second horizontal range, said second vertical range and said second address value in a range table in said memory;

means for sensing a touch on the touch sensing means by receiving a second horizontal sensing value and a second vertical sensing value;

means for determining that said second horizontal sensing value is within said second horizontal range and determining that said second vertical sensing value is within said second vertical range;

means for accessing said second address value in said range table; and means for accessing said second action code using said second address value and performing said second action.

18. The system of claim 17, which further comprises:

means for aligning said first key space with said second key space.

19. The system of claim 11, which further comprises:

means for changing the location of said first key space with respect to said keyboard space and changing the magnitude of said m1 and n1 values;

means for calculating a new first horizontal position value X+m1*Sx and a new first vertical position value Y+n1*Sy for the new location of said first key space;

means for computing a new first horizontal range of horizontal sensing values of the touch sensing means from said first relationship, using said new first horizontal position value and said first horizontal size value, and computing a new first vertical range of vertical sensing values of the touch sensing means from said second relationship, using said new first vertical position value and said first vertical size value, and storing said new first horizontal range, said new first vertical range and said first address value in said range table in said memory.

20. The system of claim 11, which further comprises:

means for changing the location of said keyboard space and changing the magnitude of said first horizontal position value X and said first vertical position value Y;

means for calculating a new first horizontal position value X+m1*Sx and a new first vertical position value Y+n1*Sy for the location of said first key space;

means for computing a new first horizontal range of horizontal sensing values of the touch sensing means from said first relationship, using said new first horizontal position value and said first horizontal size value, and computing a new first vertical range of vertical sensing values of the touch sensing means from said second relationship, using said new first vertical position value and said first vertical size value, and storing said new first horizontal range, said new first vertical range and said first address value in said range table in said memory.

21. In a data processing system having display output coupled to a memory including a keyboard editor and having a touch sensing means with horizontal and vertical sensing electrodes coupled to said memory, a method for defining a touch activated keyboard using the keyboard editor to size, re-size, store and move the keyboard any where on the display, comprising the steps of:

defining a rectangular keyboard space on the display as an original touch activated keyboard, the keyboard space having a keyboard origin located at a horizontal position value X and a vertical position value Y with respect to an origin for the display and storing said X value and said Y value in a keyboard location register in said memory;

defining a horizontal scale value Sx for the horizontal size of said keyboard space and storing said Sx value in a keyboard scale register in said memory;

defining a first polygonal key space on the display, having a first key origin located at a first horizontal position value X+(m1*Sx) and a first vertical position value Y+n1 with respect to said origin for the display and storing said X+(m1*Sx) value and said Y+n1 value in a first key location register in said memory, where m1 is a column number and n1 is a row number on the display;

defining a first horizontal size value u1*Sx for the horizontal size of said first key space and defining a first vertical size value v1 for the vertical size of said first key space and storing said u1*Sx value and said v1 value in a first key size register in said memory, where u1 is a horizontal size number and v1 is a vertical size number for said first key space;

defining a first legend image for said first key space, identified by a first legend code and storing said first legend code in a first legend register in said memory;

forming a key definition window in the display;

defining a keyboard function for said first key space using the key definition window, the function identified by a first action code and storing said first action code in a first action register at a first address having a first address value in said memory;

calibrating a first relationship between horizontal sensing values of the touch sensing means and horizontal positions on the display and calibrating a second relationship between vertical sensing values of the touch sensing means and vertical positions on the display;

computing a first horizontal range of horizontal sensing values of the touch sensing means from said first relationship, using said first horizontal position value and said first horizontal size value and computing a first vertical range of vertical sensing values of the touch sensing means from said second relationship, using said first vertical position value and said first vertical size value, and storing said first horizontal range, said first vertical range and said first address value in a range table in said memory;

forming a first key space in said memory which includes the contents of said first key location register, said first key size register, said first legend register and said first action register;

transferring said first key space record for use in a second keyboard space;

storing the original touch activated keyboard in a library in the memory; or sensing a touch on the touch sensing means by receiving a first horizontal sensing value and a first vertical sensing value;

determining that said first horizontal sensing value is within said first horizontal range and determining that said first vertical sensing value is within said first vertical range;

accessing said first address value in said range table; and accessing said first action code using said first address value and performing said first action which provides an output from the system as a simple or complex combination of characters.

22. The method of claim 21, which further comprises:

changing the horizontal size of said keyboard space and changing the magnitude of said horizontal scale value Sx;

computing a new first horizontal size value u1*Sx for the horizontal size of said first key space;

displaying a new first key space having said new first horizontal size value.

23. The method of claim 21, which further comprises:

changing the horizontal location of said keyboard space and changing the magnitude of said first horizontal position value X;

calculating a new first horizontal position value X+m1*Sx for the location of said first key space;

displaying a new first key space having said new first horizontal position value.

24. In a data processing system having display output coupled to a memory and having a touch sensing means with horizontal and vertical sensing electrodes coupled to said memory, a method for defining a touch activated keyboard to be displayed on the display, comprising the steps of:

defining a rectangular keyboard space on the display as an original touch activated keyboard, the keyboard space having a keyboard origin located at a horizontal position value X and a vertical position value Y with respect to an origin for the display and storing said X value and said Y value in a keyboard location register in said memory;

defining a vertical scale value Sy for the vertical size of said keyboard space and storing said Sy value in a keyboard scale register in said memory;

defining a first polygonal key space on the display, having a first key origin located at a first horizontal position value X+m1 and a first vertical position value Y+(n1*Sy) with respect to said origin for the display and storing said X+m1 value and said Y+(n1*Sy) value in a first key location register in said memory where m1 is a column number and n1 is a row number on the display;

defining a first horizontal size value u1 for the horizontal size of said first key space and defining a first vertical size value v1*Sy for the vertical size of said first key space and storing said u1 value and said v1*Sy value in a first key size register in said memory, where u1 is a horizontal size number and v1 is a vertical size number for said first key space;

defining a first legend image for said first key space, identified by a first legend code and storing said first legend code in a first legend register in said memory;

forming a key definition window in the display;

defining a keyboard function for said first key space using the key definition window, the function identified by a first action code and storing said first action code in a first action register at a first address having a first address value in said memory;

calibrating a first relationship between horizontal sensing values of the touch sensing means and horizontal positions on the display and calibrating a second relationship between vertical sensing values of the touch sensing means and vertical positions on the display;

computing a first horizontal range of horizontal sensing values of the touch sensing means from said first relationship, using said first horizontal position value and said first horizontal size value, and computing a first vertical range of vertical sensing values of the touch sensing means from said second relationship, using said first vertical position value and said first vertical size value, and storing said first horizontal range, said first vertical range and said first address value in a range table in said memory;

forming a first key space in sid memory which includes the contents of said first key location register, said first key size register, said first legend register and said first action register;

transferring said first key space record for use in a second keyboard space;

storing the original touch activated keyboard in a library in the memory;

sensing a touch on the touch sensing means by receiving a first horizontal sensing value and a first vertical sensing value;

determining that said first horizontal sensing value is within said first horizontal range and determining that said first vertical sensing value is within said first vertical range;

accessing said first address value in said range table;

accessing said first action code using said first address value and performing said first action.

25. The method of claim 24, which further comprises:

changing the vertical size of said keyboard space and changing the magnitude of said vertical scale value Sy;

computing a new first vertical size value v1*Sy for the vertical size of said first key space;

displaying a new first key space having said new first horizontal size value and said new first vertical size value.

26. The method of claim 24, which further comprises:

changing the vertical location of said keyboard space and changing the magnitude of said first vertical position value Y;

calculating a new first vertical position value Y+n1*Sy for the location of said first key space;

displaying a new first key space having said new first vertical position value.

27. In a data processing system having display output coupled to a memory including a keyboard editor and having a touch sensing means with horizontal and vertical sensing electrodes coupled to said memory, a system for defining a touch activated keyboard using the keyboard editor to size, re-size, store and move the keyboard any where on the display, comprising:

(a) means for defining a keyboard space on the display as an original touch activated keyboard;

(b) means for defining a first key space on the display;

(c) means for defining a first legend image for said first key space, identified by a first legend code and storing said first legend code in a first legend register in said memory;

(d) means for forming a key definition window in the display;

(e) means for defining a keyboard function for said first key space using the key definition window, the function identified by a first action code and storing said first action code in a first action register at a first address having a first address value in said memory;

(f) means for forming a first key space record in said memory which includes the contents of the first key location register, said first key size register, said first legend register and said first action register;

(g) means for transferring said first key space record for use in a second keyboard space;

(h) means for storing the original touch activated keyboard in a library in the memory; and (i) means for accessing said first action code using said first address value and performing said first action which provides an output from the system as a simple or complex combination of characters.

28. The system of claim 27 wherein the keyboard definition window comprises:
   (i) means for defining a key legend;
   (ii) means for defining normal and alternative actions for a key:
   (iii) means for defining a state key; and
   (iv) means for listing character and virtual keys in the original new keyboard.

29. The system of claim 28 further including means to transfer a key in a stored keyboard to second keyboard displayed in the display.

30. The system of claims 29 further comprising:
   (i) means for storing a plurality of keyboards in the memory;
   (ii) means for selecting and displaying a stored keyboard in the display;
   (iii) means for constructing an original keyboard in the display using the selected keyboard as a template; and
   (iv) means for transferring keys and assigned key functions from the template keyboard to the original keyboard.

31. In a data processing system having display output coupled to a memory including a keyboard editor and having a touch sensing means with horizontal and vertical sensing electrodes coupled to said memory, a method for defining a touch activated keyboard using the keyboard editor to size, re-size, store and move the keyboard any where on the display, comprising the steps of:
   (a) defining a keyboard space on the display as an original touch activated keyboard;
   (b) defining a first key space on the display;
   (c) defining a first legend image for said first key space, identified by a first legend code and storing said first legend code in a first legend register in said memory;
   (d) forming a key definition window in the display;
   (e) defining a keyboard function for said first key space using the key definition window, the function identified by a first action code and storing said first action code in a first action register at a first address having a first address value in said memory;
   (f) forming a first key space in said memory which includes the contents of said first key location register, said first key size register, said first legend register and said first action register;
   (g) transferring said first key space record for use in a second keyboard space;
   (h) storing the original touch activated keyboard in a library in the memory; and
   (i) accessing said first action code using said first address value and performing said first action which provides an output from the system as a simple or complex combination of characters.

32. The method of claim 31 further comprising the steps of
   (i) storing a plurality of keyboards in the memory;
   (ii) selecting and displaying a stored keyboard in the display;
   (iii) forming an original keyboard in the display using the selected keyboard as a template; and
   (iv) transferring keys and assigned functions from the template keyboard to the original keyboard.

33. The method of claim 31 using the key definition window further comprising the steps of:
   (i) defining a key legend;
   (ii) defining normal and alternative actions for a key:
   (iii) defining a state key; and
   (iv) listing character and virtual keys in the original new keyboard.

34. The method of claim 31 further comprising the step of:
   (i) aligning the keys in the original keyboard using an alignment pull down window displayed in the display.

35. A computer readable medium of instruction comprising:
   (a) means for defining a keyboard space on the display as an original touch activated keyboard;
   (b) means for defining a first key space on the display;
   (c) means for defining a first legend image for said first key space, identified by a first legend code and storing said first legend code in a first legend register in said memory;
   (d) means for forming a key definition window in the display;
   (e) means for defining a keyboard function for said first key space using the key definition window, the function identified by a first action code and storing said first action code in a first action register at a first address having a first address value in said memory;
   (f) means for forming a first key space record in said memory which includes the contents of the first key location register, said first key size register, said first legend register and said first action register;
   (g) means for transferring said first key space record for use in a second keyboard space;
   (h) means for storing the original touch activated keyboard in a library in the memory; and
   (i) means for accessing said first action code using said first address value and performing said first action which provides an output from the system as a simple or complex combination of characters.

36. The computer readable medium of instruction of claim 35 wherein the means for forming a keyboard definition window further comprises:
   (i) means for defining a key legend;
   (ii) means for defining normal and alternative actions for a key:
   (iii) means for defining a state key; and
   (iv) means for listing character and virtual keys in the original new keyboard.

37. The computer readable medium of instruction of claim 35 further comprises:
   (i) means for aligning the keys in the original keyboard using an alignment pull down window in the display.

38. The computer readable medium of instruction of claim 35 further comprising:
   (i) means for storing a plurality of keyboards in the memory;
   (ii) means for selecting and displaying a stored keyboard in the display;
   (iii) means for constructing an original keyboard in the display using the selected keyboard as a template; and
   (iv) means for transferring keys and assigned key functions from the template keyboard to the original keyboard.

* * * * *